US012624621B2

(12) United States Patent
Buckley et al.

(10) Patent No.: US 12,624,621 B2
(45) Date of Patent: May 12, 2026

(54) HYBRID ELECTRIC TRANSMISSION FOR HYDRAULIC FRACTURING

(71) Applicant: INY LLC, The Woodlands, TX (US)

(72) Inventors: Christopher Buckley, Montgomery, TX (US); Brian Boguski, Milford, OH (US); Joseph McFarland, Newaygo, MI (US)

(73) Assignee: INY LLC, The Woodlands, TX (US)

( * ) Notice: Subject to any disclaimer, the term of this patent is extended or adjusted under 35 U.S.C. 154(b) by 0 days.

(21) Appl. No.: 18/954,837

(22) Filed: Nov. 21, 2024

(65) Prior Publication Data

US 2025/0163790 A1 May 22, 2025

Related U.S. Application Data

(60) Provisional application No. 63/670,052, filed on Jul. 11, 2024, provisional application No. 63/670,056, (Continued)

(51) Int. Cl.
| | |
|---|---|
| *E21B 43/26* | (2006.01) |
| *B60K 6/26* | (2007.10) |
| *F04B 17/03* | (2006.01) |
| *F04B 17/05* | (2006.01) |
| *F16H 57/02* | (2012.01) |

(52) U.S. Cl.
CPC ............ *E21B 43/2607* (2020.05); *B60K 6/26* (2013.01); *F04B 17/03* (2013.01); *F04B 17/05* (2013.01);
(Continued)

(58) Field of Classification Search
CPC ...... F04B 17/03; F04B 17/05; E21B 43/2607; E21B 4/04; E21B 41/0085; E21B 43/128;
(Continued)

(56) References Cited

U.S. PATENT DOCUMENTS 6,524,215 B1 * 2/2003 Schmidt ................. B60K 6/365
903/910
6,558,283 B1 5/2003 Schnelle
(Continued)

FOREIGN PATENT DOCUMENTS

| CN | 219769634 U | 9/2023 |
|---|---|---|
| FR | 3106089 A1 | 7/2021 |

OTHER PUBLICATIONS

Search and Written Opinion issued for International Patent Application No. PCT/US2024/056835, dated Jan. 31, 2025, 11 pages.
(Continued)

*Primary Examiner* — Bobby Rushing, Jr.
(74) *Attorney, Agent, or Firm* — Haynes and Boone, LLP; Mark A. Tidwell

(57) ABSTRACT

A hydraulic fracturing system includes a hybrid electric transmission assembly to transfer power from an internal combustion engine to a hydraulic fracturing pump. The transmission assembly includes a first driveshaft coupled to the engine and a second driveshaft coupled to the pump with a primary drivetrain gear assembly coupling the first driveshaft to the second driveshaft. An electric drive gearset is disposed between the primary drivetrain gear assembly and the pump. An electric motor is couplable to the electric drive gearset, thereby allowing power to be passed from the electric motor to drive the pump and bypass the primary drivetrain gear assembly during the gear change. The system may include a plurality of electric motors each having an electric motor axis and an output gearset coupled to the electric drive gearset, where each of the electric motor axii are spaced radially outward from the first and second driveshafts.

7 Claims, 22 Drawing Sheets

Related U.S. Application Data filed on Jul. 11, 2024, provisional application No. 63/601,666, filed on Nov. 21, 2023.

(52) U.S. Cl.
CPC ... *F16H 57/02* (2013.01); *F16H 2057/02034* (2013.01); *F16H 2057/02073* (2013.01)

(58) Field of Classification Search
CPC ........... B60K 6/26; B60K 6/405; F16H 57/02; F16H 2057/02017; F16H 2057/02034; F16H 2057/02069; F16H 2057/02073
See application file for complete search history.

(56) References Cited

U.S. PATENT DOCUMENTS

| | | | | |
|---|---|---|---|---|
| 6,692,394 | B2 | 2/2004 | Takenaka | |
| 6,793,600 | B2 | 9/2004 | Hiraiwa | |
| 11,111,768 | B1 * | 9/2021 | Yeung | E21B 43/2607 |
| 11,408,255 | B2 * | 8/2022 | Rouse | F02D 29/04 |
| 2002/0082134 | A1 | 6/2002 | Hirt et al. | |
| 2005/0036894 | A1 | 2/2005 | Oguri | |
| 2009/0095548 | A1 | 4/2009 | Tamba et al. | |
| 2014/0123787 | A1 | 5/2014 | Zhu et al. | |
| 2018/0283513 | A1 | 10/2018 | Desch et al. | |
| 2019/0178235 | A1 | 6/2019 | Coskrey et al. | |
| 2019/0249754 | A1 | 8/2019 | Oehring et al. | |
| 2020/0095848 | A1 * | 3/2020 | Rouse | H02K 7/003 |
| 2020/0278015 | A1 | 9/2020 | Chu | |
| 2021/0230987 | A1 | 7/2021 | Tanner | |
| 2023/0114369 | A1 | 4/2023 | Brudeli | |
| 2023/0258172 | A1 | 8/2023 | Clark et al. | |
| 2024/0360747 | A1 * | 10/2024 | Kabrich | F04B 49/20 |

OTHER PUBLICATIONS

Search Report and Written Opinion issued for International Patent Application No. PCT/US2024/056827, dated Jan. 24, 2025, 8 pages.

* cited by examiner

HYBRID ELECTRIC TRANSMISSION FOR HYDRAULIC FRACTURING

CROSS-REFERENCE TO RELATED APPLICATIONS

This application claims priority to U.S. Provisional Pat. App. No. 63/601,666, filed Nov. 21, 2023 and U.S. Provisional Pat. App. No. 63/670,056, filed Jul. 11, 2024 and U.S. Provisional Pat. App. No. 63/670,052, filed Jul. 11, 2024, the disclosures of which are all incorporated by reference herein in their entirety.

TECHNICAL FIELD

This disclosure relates to a hydraulic fracturing system, and more particularly, to a hybrid electric transmission used to operate a hydraulic fracturing system.

BACKGROUND

Hydraulic fracturing operations are often used during hydrocarbon production from oil and gas wells to increase volumes that can be recovered from the oil and gas wells. Hydraulic fracturing produces fractures in the rock formation in which the oil and gas wells are drilled by utilizing large pumps to introduce a high-pressure mixture of water, sand, and chemicals into the rock formation, thereby creating pathways in the rock formation through which the oil and gas may flow. As a non-limiting example, such pumps may generally operate at pressures of 7500-14,000 PSI if not more, and at speeds of 95-140 RPMs.

Commonly, an internal combustion engine is utilized to drive such a hydraulic fracturing pump given the large amount of power generally required to operate hydraulic fracturing pumps. The power from such internal combustion engine is typically passed to the hydraulic fracturing pump via a transmission assembly have one or more gearsets that can be utilized to alter the torque passing from the internal combustion engine to the hydraulic fracturing pump. For example, a hydraulic fracturing transmission may have six or more gearsets, such as a $1^{st}$ gear, $2^{nd}$ gear, $3^{rd}$ gear, $4^{th}$ gear, $5^{th}$ gear and $6^{th}$ gear, which are gradually utilized to bring hydraulic fracturing pump up to operational speed in order to achieve a desired throughput. One drawback to these traditional systems is the drop-off in power to the pump during a gear change of the primary driving gear. This drawback is especially acute because hydraulic fracturing pumps represent non-inertial loads. Specifically, motion or operation of the load, in this case a hydraulic fracturing pump, immediately terminates when power from the external power source driving the external load is removed. Such abrupt stoppage in operation, called non-inertial pulldown, even briefly, negatively impacts the transmission of power during the gear change. In fact, in extreme cases, non-inertial pulldown can result in stalling of the internal combustion engine which typically have a minimum operating speed (rpm), it being understood that the non-inertial pulldown as experienced by the internal combustion engine could cause the speed (rpm) of drop below minimum operating conditions.

Thus, there is a need to minimize non-inertial pulldown during operation of hydraulic fracturing pumping systems.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Disclosed herein is a hybrid hydraulic fracturing system having a hybrid electric transmission assembly disposed to transfer primary driving power from an internal combustion engine to a hydraulic fracturing pump. The hybrid electric transmission assembly includes a first driveshaft and a second driveshaft extending along a transmission primary axis with a primary drivetrain gear assembly coupling the first driveshaft to the second driveshaft. A supplemental electric drive gearset is disposed along the second driveshaft. The first driveshaft is operatively coupled to the internal combustion engine and the second driveshaft is operatively coupled to the hydraulic fracturing pump. An electric motor is couplable to the supplemental electric drive gearset between the primary drivetrain gear assembly and the hydraulic fracturing pump, thereby allowing power from the electric motor to bypass the primary drivetrain gear assembly for various operations, such as during a gear change in the primary drivetrain gear assembly. In other embodiments, a primary electric drive gearset may be disposed along the first driveshaft and coupled to two or more radially offset electric motors, where the two or more radially offset electric motors are each disposed along a separate electric motor axis that is parallel with but spaced racially outward from the transmission primary axis. In some embodiments, the two or more radially offset electric motors are mounted on and supported by a transmission housing in which the primary drivetrain gear assembly is disposed.

Figure 1A:
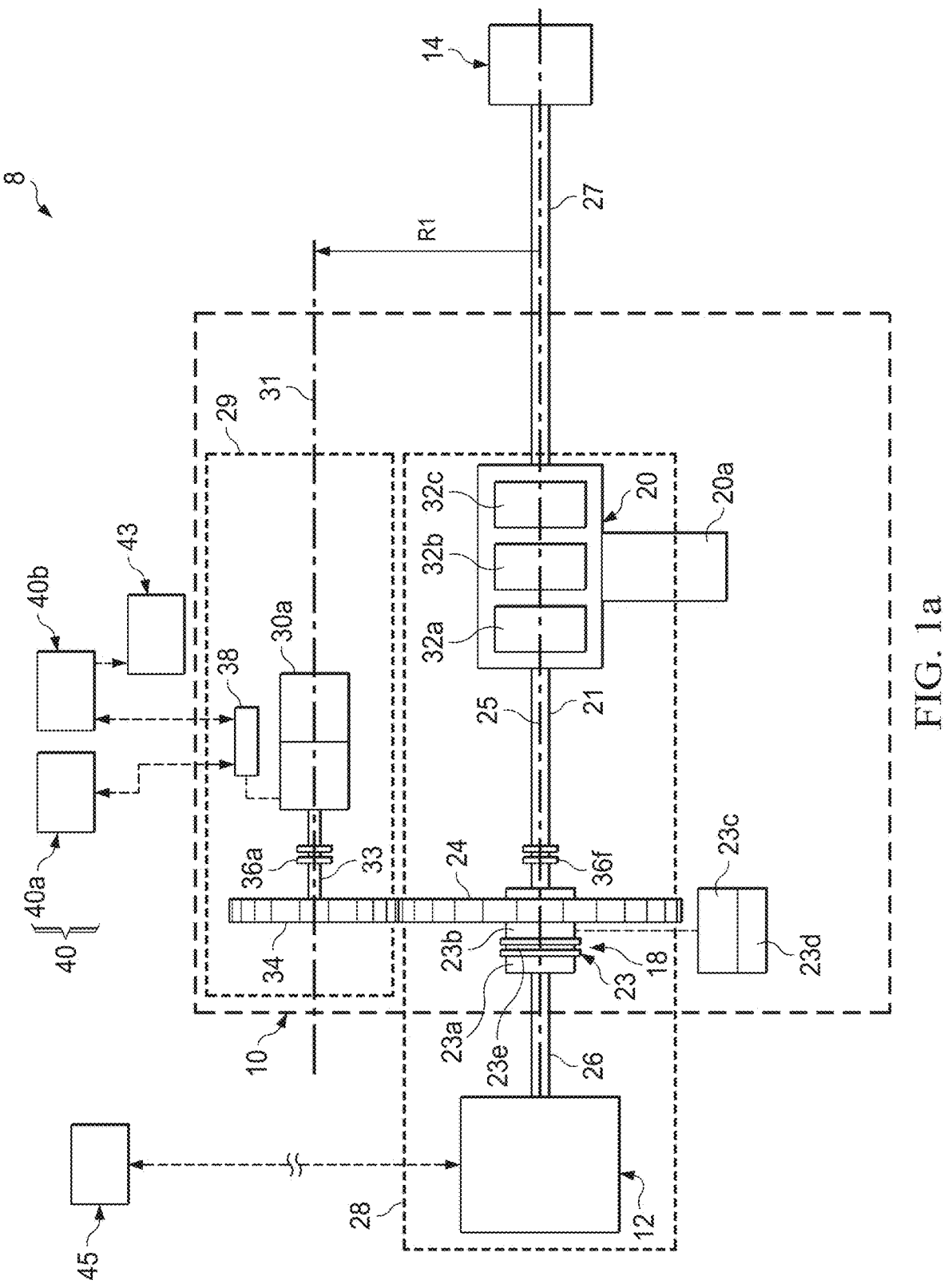
FIG. 1a illustrates a hybrid hydraulic fracturing system having a hybrid electric transmission assembly with an electric motor radially offset from the primary driveline.
Figure 1B:
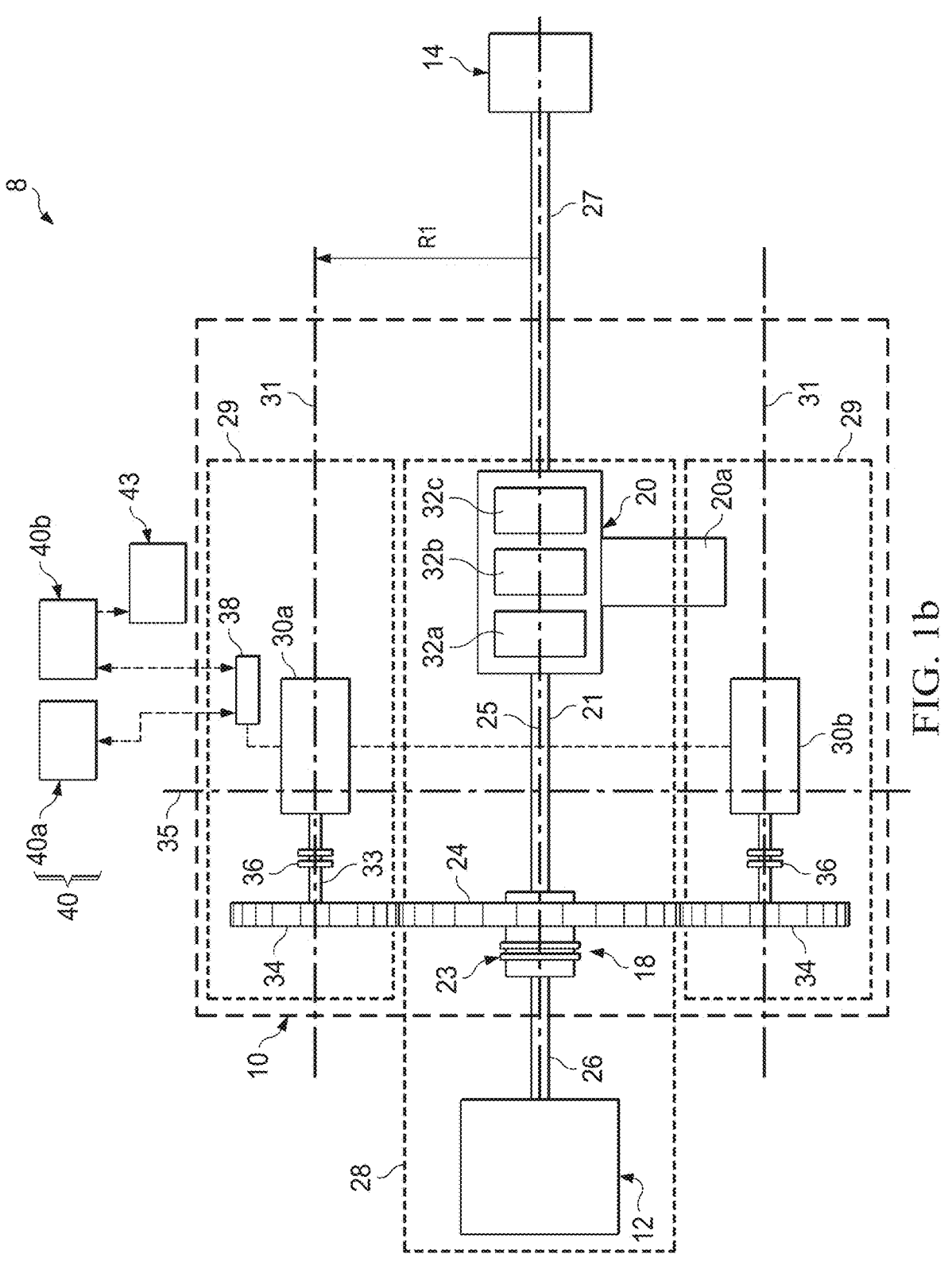
FIG. 1b is similar to FIG. 1a, but illustrates multiple electric motors radially offset from the primary driveline.

With reference to FIGS. 1*a* and 1*b*, a hybrid hydraulic fracturing system 8 is depicted. Hybrid hydraulic fracturing system 8 includes a hybrid electric transmission assembly 10 disposed to couple an external power source 12 to an external load 14. Hybrid hydraulic fracturing system 8 utilizes one or more electric motors 30 radially offset from the primary driveline of the hybrid electric transmission assembly 10 to selectively provide power to hybrid hydraulic fracturing system 8 downstream of external power source 12. External power source 12 provides mechanical power to the hybrid electric transmission assembly 10 in order to drive external load 14.

In one or more embodiments, external power source 12 is an internal combustion engine, including without limitation, piston engines and gas turbines. In one or more embodiments where external power source 12 is a piston engine, the piston engine may be a dual fuel engine disposed to combust both liquid fuel, such as diesel, and gaseous fuel, such as natural gas.

While external load 14 need not be limited to particular driven equipment in hydrocarbon drilling and production equipment, in one or more embodiments, external load 14 is one or more hydraulic fracturing pumps.

Hybrid electric transmission assembly 10 can include an engagement mechanism 18 to selectively engage and disengage a power input driveshaft 26 and transmission driveshaft 21.

Optionally, engagement mechanism 18 may be a torque converter/harmonic damper 23 coupled to a primary drive train gear assembly 20 via a transmission driveshaft 21. In such embodiments, torque converter/harmonic damper 23 may include at least an impeller assembly 23*a* and a stator assembly 23*b* one or both of which may be partially or fully enclosed to defining a primary fluid reservoir 23*e* as are known in the art. The disclosure is not limited to a particular arrangement of the torque converter/harmonic damper 23. In any event, it will be appreciated that torque converter assembly 23 may be particularly desirable where external load 14 is a non-inertial system. In such non-inertial systems, potential damage to the external power source 12 that could result from a deadhead event may be mitigated by the presence of the torque converter assembly 23 since energy from the deadhead event can be dissipated by torque converter assembly 23.

While a torque converter assembly 23 is illustrated, in other embodiments, torque converter assembly 23 may be eliminated.

In one or more other embodiments, engagement mechanism 18 may be clutches, clutch plates, shift mechanisms or other devices. In one or more embodiments, engagement mechanism 18 may be pneumatically activated, hydraulically activated or electrically activated. For example, engagement mechanism 18 may be an electric clutch, a hydraulic clutch or pneumatic clutch.

Engagement mechanism 18 may be coaxial with transmission driveshaft 21 along transmission primary axis 25.

It will be understood that any particular driveshaft or other rotatable shaft as described herein may be formed of one or more rotatable shafts and need not be a single unitary shaft.

In some embodiments, input driveshaft 26 extends along transmission primary axis 25. Primary drive train gear assembly 20 is coupled to external load 14 via an output driveshaft 27. In some embodiments, output driveshaft 27 extends along transmission primary axis 25.

In one or more embodiments, external power source 12, input driveshaft 26, engagement mechanism 22, transmission driveshaft 21, drive train gear assembly 20 and output driveshaft 22 are arranged along primary axis 25 and represent a primary drivetrain 28, while electric motor(s) 30 is disposed along a separate electric motor axis 31 and represents a secondary drivetrain 29 that is parallel with but spaced radially apart from primary axis 25 so as to be radially offset therefrom. In one or more embodiments, hybrid electric transmission assembly 10 may have a plurality of secondary drivetrains 29, each having an electric motor axis 31 with one or more electric motors 30 disposed therealong.

Disposed between engagement mechanism 18 and primary drive train gear assembly 20 is a primary electric drive gearset 24 coupled to transmission driveshaft 21. In one or more embodiments, a primary electric drive gearset 24 may be intermittently coupled to transmission driveshaft 21. In one or more embodiments, primary electric drive gearset 24 may be coaxial with transmission driveshaft 21 along transmission primary axis 25. In one or more embodiments, primary electric drive gearset 24 may be a planetary gearset, while in other embodiments, primary electric drive gearset 24 may be one or more spur gears.

Primary drive train gear assembly 20 includes one or more gearsets 32 that are selectable as the primary driving gear to transfer power from external power source 12 to external load 14. During a gear change within primary drive train gear assembly 20, the primary driving gear is shifted from one gearset 32 to another gearset 32 In some embodiments, primary drive train gear assembly 20 may include a plurality of gearsets. In some embodiments, primary drive train gear assembly 20 may include at least three gearsets 32a, 32b, 32c. Thus, for example, a gear change could result in the primary driving gear being changes from gearset 32a to gearset 32b. Where gearset 32a is a lower gear, such as first gear, and gearset 32b is a higher gear, such as second gear, the gear change from gearset 32a to gearset 32b as the primary driving gear would be an upshift in the primary driving gear from a lower gear to a higher gear. In other embodiments, the gear shift might be from a higher gear as the primary driving gear to a lower gear. Where primary drive train gear assembly 20 includes at least two gearsets 32, the gearsets may be coupled together. In some embodiments, primary drive train assembly 20 may include at least six gearsets. In some embodiments, primary drive train assembly 20 may include at least nine gearsets from which the primary driving gear may be selected through a gear change sequence.

In some embodiments of drive train assembly 20, one or more of the gearsets 32 may be a planetary gearset.

In one or more embodiments, drive train gear assembly 20 is a planetary clutch having a plurality of gearsets 32 that are each a planetary gearset. In or more embodiments, planetary clutch 20 includes six planetary gearsets 32, although planetary clutch 20 may have more or fewer planetary gearsets 32. Drive train gear assembly 20 may also include a shift mechanism 20a that can be actuated to shift between gearsets 32. The disclosure is not limited to a particular shift mechanism 20a for implementation of a gear change, but may include, among others, hydraulic, electric, or pneumatic shift mechanisms. In some embodiments, for example, shift mechanism 20a may hydraulically shift gearsets 32. In such case, hydraulic actuation allows the gear shift to be modulated in order to address the circumstance where a fast gear change may be needed in some situations.

While some embodiments of hybrid electric transmission assembly 10 may use only a single radially offset electric motor 30 such as shown in FIG. 1a or two radially offset electric motors 30 such as is shown in FIG. 1b, as best seen in FIGS. 11, 12a, 12b and 12c, in some embodiments, hybrid electric transmission assembly 10 may include a plurality of radially spaced apart electric motors 30, such as electric motors 30a, 30b, 30c, each disposed along its own electric motor axis 31 that extends parallel with primary axis 25 and parallel with the other electric motor axii 31. In any of these embodiments, however, the electric motor(s) 30 are spaced radially outward from axis 25 so that axii 31 of the respective electric motors 30a, 30b, 30c are parallel with output driveshaft 27 and transmission primary axis 25, as well as with one another.

In some embodiments, the plurality of radially offset electric motors 30 may be disposed in a plane 35 that is perpendicular to transmission primary axis 25, thereby allowing each of the electric motors 30 to be more readily coupled to one of the input driveshaft 26 or the output driveshaft 27 utilizing a single electric drive gearset mounted thereon, such as gearset 24.

In any event, the embodiments of hybrid electric transmission assembly 10 of FIGS. 1a and 1b utilize electric motor(s) 30 to provide equilibrium power (as opposed to driving power) to an output gearset 34 that is meshed with primary electric drive gearset 24, thereby minimizing forces from the external load 14 from impacting a gear change in drive train gear assembly 20 and also maintaining external load 14 in an equilibrium condition during the gear change. In one or more embodiments, primary electric motor 30 includes a primary electric output shaft 33 extending along an electric motor axis 31 and on which output gearset 34 is mounted. More specifically, although external power source 12 when fully operational is used to provided driving power to hybrid electric transmission assembly 10 in order to drive external load 14, during a gear change, operation of hybrid electric transmission assembly 10 is handed off or transferred from external power source 12 to electric motor(s) 30 so that electric motor(s) 30 provides power to hybrid electric transmission assembly 10 during the gear change, it being understood that during such gear change, driving power transmitted to external load 14 can be temporarily suspended. Rather, electric motor(s) 30 provide equilibrium power to drive train gear assembly 20.

In the context of a non-inertial load, where driving power is suspended or drops below a predetermined torque, a deadhead condition can result, which in prior art systems, such deadhead condition could be transferred back to the internal combustion engine, causing a possible stall of the internal combustion engine. In any event, in one or more embodiments of hybrid electric transmission assembly 10, during a change in the primary driving gear of drive train gear assembly 20, power from external power source 12 is temporarily suspended while electric motor(s) 30 are utilized to equilibrium power to drive train gear assembly 20. As used herein, equilibrium power means that external load 14 is not being driven. For example, where external load 14 is a hydraulic fracturing pump, the pump is not moving fluid. Rather, the pump is held in an equilibrium state so that the pump can be readily actuated upon completion of the gear change without having to overcome deadhead forces placed on the pump by the overall pressurized network. Once a gear change has been completed, operation of hybrid electric transmission assembly 10 is handed or transferred back to external power source 12 from electric motor(s) 30 so that external power source 12 can thereafter provide driving power to hybrid electric transmission assembly 10 in order to operate external load 14. Thus, the external power source 12 is not utilized during gear changes. As such, the likelihood of the external power source 12 dropping below a "stall" rpm is minimized during gear change. For example, internal combustion engines utilized in certain high torque gear changes will stall when the operating speed of the internal combustion engine drops below 1350 revolutions per minute by virtue of the torque placed on the internal combustion engine by the external load 14. By utilizing electric motor(s) 30 to change gears in the hybrid electric transmission assembly 10, the speed of the decoupled external power source 12 can be kept above this stall threshold. It will be appreciated that in the embodiments of FIG. 1, electric motor(s) 30 need not assist the external power source 12 in providing driving power to external load 14, but rather, temporarily replacing external power source 12 during a gear change to provide equilibrium power to hybrid electric transmission assembly 10. Where electric motor(s) 30 are used to provide equilibrium power, external power source 12 is not utilized during gear change and driving power to external load 14 is temporarily suspended.

An engagement mechanism 36 may be provided to selectively engage and disengage electric motor 30 from output gearset 34. In this regard, engagement mechanism 36 may be disposed along primary electric output shaft 33. In one or more embodiments, engagement mechanism 36 may be electrically activated, hydraulically activated or pneumatically activated. For example, engagement mechanism 36 may be an electric clutch, a hydraulic clutch or pneumatic clutch.

It will be appreciated that a plurality of smaller electric motors 30 as described in one or more embodiments are more desirable because of ease of maintenance. Specifically, one electric motor 30 may be taken offline while the other electric motors 30 can continue to operate as described herein, avoiding the need to interrupt operation of hybrid electric transmission assembly 10.

In this regard, a single, large electric motor needed to achieve a particular horsepower output to drive a hydraulic fracturing pump 14 or other equipment requiring over 700 horsepower may be cumbersome and have a large footprint for a skid mounted hydraulic fracturing system. Such a motor would typically be at least 1750 horsepower and of such a large size that it must be mounted coaxially along the driveshaft of a prior art transmission, increasing the overall physical length and footprint of the system with which it is used. In contrast, a plurality of comparatively smaller horsepower motors that are radially offset as described herein can be utilized to minimize the footprint of the hybrid hydraulic fracturing system 8. In one non-limiting example, for instance, the "smaller" electric motors may be 50-100 horsepower, while in other embodiments, the smaller electric motors may be 500 horsepower. In any event, the electric motors 30 may have a horsepower that is less than the single, large axially aligned electric motors of the prior art.

In addition, it will be appreciated that a plurality of electric motors 30 as described in one or more embodiments are more desirable because of the ability to quickly alter the electric motor power input during a particular gear change operation. In any event, the plurality of electric motors 30a, 30b, 30c may operate in parallel so that each may be selectively meshed directly or indirectly to electric drive gearset 24. In addition, a plurality of comparatively smaller horsepower motors (as opposed to one large electric motor disposed along primary transmission primary axis 25 as common in the prior art) as anticipated in some embodiments can be readily mounted on transmission housing 70 (see FIG. 11), in order minimizing the footprint of the power production system while allowing both the electric motors 30 for gear changing and the external power source 12 for driving an external load 14 to be incorporated in a single, skid mounted system.

Each electric motor 30 may be driven by an electric inverter 38 electrically coupled thereto. Electric inverter 38 may be utilized to energize electric motor 30, as well as control the speed or torque of electric motor 30. In some embodiments, each electric motor 30 has its own electric inverter 38, while in other embodiments, one electric inverter 38 electrically coupled to two or more electric motors 30 may be utilized to control the two or more electric motors 30.

In some embodiments, electric inverter 38 may also control the operation of shift mechanism 20a to coordinate a shift between gearsets 32 and energizing electric motors 30 for powering the gearchange. Thus, electric inverter 38 is electrically coupled to both the electric motor(s) 30 and the shift mechanism 20a to coordinate operation thereof during a gear change as described herein, it being appreciated that in order to achieve the results of minimizing non-inertia pulldown the energizing electric motor(s) 30 and initiating a gear change between gearsets 32 of primary drivetrain assembly 20 must be coordinated accordingly.

Similarly, because of the need to carefully coordinate operation of multiple electric motors 30 to provide power as described herein, in some embodiments, a single electric inverter 38 may be electrically coupled to a plurality of electric motors 30 so as to control the plurality of electric motors 30 simultaneously.

Electric inverter 38 may be utilized to manage electricity supplied by one or more electricity sources 40 in order to energize electric motor(s) 30.

Electricity source 40 need not be limited to a particular source of electricity. In some embodiments, electricity source 40 may include local electricity storage 40a, such as a battery, while in other embodiments, electricity source 40 may in the alternative or in addition thereto include an additional electric supply 40b, such as a power grid or electric generator. In some embodiments of hybrid electric transmission assembly 10, electricity source 40 may be only a battery assembly 40a, while in other embodiments of hybrid electric transmission assembly 10, electricity source 40 may be a battery assembly 40a to store electricity locally with respect to hybrid electric transmission assembly 10 together with an additional electric supply 40b, such as a local electric generator, an electric power grid or some other electricity source capable of providing power to electric motors 30 over the period of time required by electric motor(s) 30. Where electric motor(s) 30 are used only during the limited period a gear change, electricity source 40 may be intermittent in its delivery of electricity and utilize one type of electricity source 40, such as batter assembly 40a. On the other hand, where electric motor(s) 30 are used over a longer period of time and require a more extended supply of electricity, electricity source 40 may be a different type of electricity source 40b, such as a power grid. In some embodiments, an electric motor 30 may be driven alternately by a first electricity source 30a and a second electricity source 30b depending on a given operation of hybrid electric transmission assembly 10 understanding that different operations of hybrid electric transmission assembly 10 may have different electricity requirements. The electric motor(s) 30 as depicted in FIGS. 1a and 1b are utilized to assist during a change in gears within the drivetrain assembly 20 so that momentum in the operation of external load 14 is not lost during the gear change. In the case of inertial loads, this minimizes loss of momentum in the operation of external load 14 during the gear change as could occur during a gear change where external power source 12 is providing the driving power. To be clear, during a gear change within drivetrain gear assembly 20 as shown in FIG. 1, driving operation of external load 14 may be temporarily suspended while electric motor(s) 30 drive the transmission assembly 10 to facilitate the gear change.

In one or more embodiments, electric motor 30 may also be an alternator or electric generator utilized to produce electricity from operation of external power source 12. This allows excess horsepower from external power source 12 to be utilized, particularly where the horsepower requirements for external load 14 are less than the horsepower capacity of external power source 12. For example, external power source 12 may be a diesel engine rated at 2500 horsepower (hp) whereas external load 14 may be a hydraulic fracturing pump with an operating horsepower of 1700 hp. By utilizing electric motor 30 as a generator, the additional horsepower can be utilized to generate electricity that can be stored locally in battery assembly 40a or directed back to the electric grid 40b.

On the other hand, where the external power source 12 has a horsepower rating that is less than the horsepower rating of the external load 14, then electric motor 30 can be operated using electricity from electricity source 40 to provide the additional horsepower needed to meet the horsepower requirements of the external load 14. In the example utilized above, the hydraulic fracturing pump may have a horsepower rating greater than 2500 hp (such as 3000 hp), in which case, electric motors 30 can provide supplemental horsepower to hybrid electric transmission assembly 10 to make up the 500 horsepower difference. Notably, in such instances, both external power source 12 and electric motor (s) 30 are providing power to transmission driveshaft 21 with electric motor(s) 30 coupled to transmission driveshaft 21 downstream of engagement mechanism 18.

In this same vein, rather than operating hybrid electric transmission assembly 10 to achieve a certain horsepower output for external load 14, electric motors 30 may be utilized to take full advantage of the horsepower capacity of primary drive train gear assembly 20 in order to maximize transmission potential. For example, primary drive train gear assembly 20 may have a horsepower capability of 3300 hp, while external power source 12 may have a maximum output capacity of 2500 hp. By supplementing the horsepower from external power source 12 with horsepower from electric motor(s) 30, the transmission potential of primary drive train gear assembly 20 can be maximized. This is particularly desirable where primary drive train gear assembly 20 is comprised of a plurality of planetary gearsets 32a, 32b, 32c. In such case, primary drive train gear assembly 20 has a first horsepower capacity, while external power source 12 has a second horsepower capacity the maximum of which is less than the first horsepower capacity. In such case, the difference between the first horsepower capacity and the second horsepower capacity can be made up by the electric motor(s) 30, where the electric motor(s) have a third horsepower capacity. In one or more embodiments, the third horsepower capacity is at least as large as the difference between the first horsepower capacity and the second horsepower capacity.

It will be appreciated that where electric motor 30 is utilized to produce electricity, the produced electricity can be used to power auxiliary equipment 43, either directly or from a battery 40a. For example, where external load 14 is a hydraulic fracturing pump, auxiliary equipment 43 may be mixers, blender or data vans used in association with hydraulic fracturing operations.

In one or more embodiments, one or more of electric motors 30 may be axial flux electric motors. It will be appreciated that axial flux electric motors can readily be utilized as an electric motor to produce mechanical energy or as a generator to produce electricity. One advantage of axial flux motors is that they shorten the length of the overall footprint of the hybrid hydraulic fracturing system 8. In this regard, axial flux motors being shorter in axial length than a radial flux motor with the same power density, are more readily supported on transmission housing 70 as described in FIG. 11.

In other embodiments, the hybrid electric transmission assembly 10 can be used to achieve energy balancing and optimization based on the available energy sources at any given time. For example, an energy source may be more expensive or less available at one time of the day, in which case, reliance on that energy source to drive hybrid electric transmission assembly 10 can be minimized while reliance on other energy sources to drive hybrid electric transmission assembly 10 can be increased. Of course, it will be appreciated that locally stored electricity from battery 40a is most desirable since this energy is substantially less expensive than other energy sources supplied externally, such as, for example, natural gas. In this regard, it is common to run out of natural gas as an energy source in the oilfield during hydraulic fracturing or other operations, which can interrupt hydraulic fracturing operations. Thus, a control system 45 may be used to monitor the availability of energy sources and the cost of the energy sources at any given time and dynamically switch hybrid electric transmission assembly 10 between the energy sources (to operate either external power source 12 or electric motors 30 or blending of both horsepower from both) to optimize operation and minimize cost in the production of output horsepower for external load 14. In this regard, where blending of horsepower is utilized, the blending can be dynamic as described based on the availability and cost of energy at any particular time. Thus, during operation of an external load, the external load 14 may be initially driven by external power source 12 while control system 45 is utilized to monitor one or more market parameters of a first energy source, such as natural gas or diesel. Non-limiting examples of market parameters may include price, availability, regulatory or customer preference. When an identified market parameter changes, operation of external power source 12 may be suspended and electric motors 30 may be utilized to drive the external load 14 until such time as an additional change in the market parameter dictates a change in the power source. For example, if the price of diesel fuel rises above a predetermined threshold, operation of external power source 12 may be suspended and electric motors 30 may be utilized until such time as the price of diesel fuel drops below such threshold or another change in a market parameter dictates that power once again be provided by external power source 12, such as a depletion of electricity source or an interruption in the electricity supply for electric motors 30.

Finally, in one or more embodiments, electric motor 30 may be utilized to apply a controlled startup torque on external power source 12 during startup of external power source 12, providing resistance to external power source 12 upon startup. In such embodiments, an engagement mechanism 36f may be provided along transmission driveshaft 21 to decouple external power source 12 from primary drive train assembly 20, isolating external power source 12 from external load 14 and thereby allowing electric motor 30 to provide a controlled load on external power source 12 during start up. Specifically, in order to warm up properly before operating primary drive train assembly 20 and external load 14, it is desirable to provide a resistive torque on external power source 12 until external power source 12 has achieved certain threshold operating conditions, such as a particular speed, torque or internal temperature. Because electric motor 30 is torque and speed controlled, electric motor 30 can be used for this purpose. Thereafter, once threshold operating parameters for external power source 12 have been achieved, engagement mechanism 36f can be activated to couple external power source 12 to primary drive train assembly 20. Where electric motor 30 is only used for the purpose of providing controlled start up torque to external power source 12, engagement mechanism 36a may be activated to decouple electric motor 30 from transmission driveshaft 21, namely, during use of external power source 12 to drive external load 14.

It will be appreciated that where electric motor 30 is utilized to apply a controlled startup torque on external power source 12 during startup of external power source 12, a torque converter can be eliminated from driveshaft 26 upstream of electric drive gearset 24.

Optionally in hybrid electric transmission assembly 10, the one or more electric motors 30 can be utilized as a dynamometer to test the operation of external power source 12. Specifically, the one or more motors 30 can be configured to create a metered resistance in the external power source 12, allowing the health and performance of external power source 12 to be evaluated without the need to remove the external power source 12. It will be appreciated that such evaluation is possible because the one or more electric motors can be selected to have the same or greater power output that external power source 12. For example, external power source 12 is a typical internal combustion engine, external power source 12 may have an output torque of ~10,000 Nm where the electric motors 30 can output and torque value of ~2,700 Nm each, with the combined output of ~10,800 the electric system can displace more torque than the external power source 12.

Optionally, in embodiments of hybrid electric transmission assembly 10 that include a torque converter assembly 23, the fluid characteristics, such as fluid volume or fluid level or even fluid type, within torque converter assembly 23 can be optimized to maximize the energy transfer between the stator assembly 23b and the impeller assembly 23a. Adjusting the fluid characteristics within torque converter assembly 23, and in particular, primary fluid reservoir 23e, will change the power transfer. For example, if stator assembly 23b is rotated in a direction opposite to the normal direction of operation, this would create a negative torque transfer, which isn't optimal. Reducing the fluid volume in the torque converter assembly 23 will minimize this negative impact. Thus, in some embodiments, a pump 23c in fluid communication with primary fluid reservoir 23e may be utilized to change a fluid characteristic in torque converter assembly 23 in order to adjust torque transfer. Pump 23c may also be in fluid communication with a fluid supply reservoir 23d and utilized to increase or decrease the fluid level or volume or type in torque converter assembly 23 on demand. In one or more embodiments, such fluid characteristic adjustments may be made in real time during operation of external load 14 so that pump 23c can be used to make adjustments to torque transferred from external power source 12 to external load 14.

In one or more embodiments, the fluid is transmission oil. In one or more embodiments, torque converter assembly 23 may include two or more fluid supply reservoirs 23d, where each fluid supply reservoir 23d has a fluid with a different characteristic, such as different densities or different heat transfer capabilities. In such case, depending on a particular need, a first fluid from a first fluid reservoir may be pumped or a second fluid from a second fluid reservoir may be pumped.

The hybrid electric transmission assembly 10 of FIG. 1b is similar to the hybrid electric transmission assembly 10 of FIG. 1a, but hybrid electric transmission assembly 10 of FIG. 1b includes at two primary electric motor 30a, 30b spaced radially outward from transmission primary axis 25, where each primary electric motor 30a, 30b includes an output gearset 34 that is meshed with electric drive gearset 24. Primary electric motor 30a, 30b are arranged in parallel. In this vein, primary electric motor 30a, 30b may be operated in parallel in some embodiments, while in other embodiments, primary electric motor 30a, 30b may be operated in the alternative.

In any event, in one or more embodiments, each primary electric motor 30 includes a primary electric output shaft 33 extending along an electric motor axis 31 and on which an output gear 34 is mounted. Moreover, an engagement mechanism 36 may be provided to selectively engage and disengage primary electric motor 30 from output gearset 34. In this regard, engagement mechanism 36 may be disposed along primary electric output shaft 33. In one or more embodiments, engagement mechanism 36 may be electrically activated, hydraulically activated, or magnetically or pneumatically activated. For example, engagement mechanism 36 may be an electric clutch, a hydraulic clutch or pneumatic clutch or magnetic clutch. As best seen in FIGS. 11 and 12, in some embodiments, hybrid electric transmission assembly 10 may include a plurality of radially spaced apart primary electric motors 30, such as primary electric motors 30a, 30b, 30c, each disposed along its own electric motor axis 31 that extends parallel with primary axis 25 and parallel with the other electric motor axii 31. In such case, the primary electric motors 30 are spaced radially outward from axis 25 so that axes 31 of the respective primary electric motors 30a, 30b, 30c are parallel with output driveshaft 27 and transmission primary axis 25 as well as with one another. In some embodiments, the plurality of primary electric motors may generally be disposed in a plane 35 that is perpendicular to transmission primary axis 25.

Similar to FIG. 1a, in FIG. 1b, electric motors 30a, 30b are energized by an electricity source 40. In one or more embodiments, the electricity source 40 may include both a battery assembly 40a and an additional electric supply 40b and used to energize electric motors 30a, 30b during the gear change operation before driving power of the external load 14 is handed back to external power source 12.

Of course, while hybrid electric transmission assembly 10 may utilize both a battery assembly 40a and an additional electric supply 40b to energize motors 30a, 30b as described, in other embodiments, electric motors 30a, 30b may simply be energized during the entire gear change by only one of the battery assembly 40a or additional electric supply 40b.

Turning back to FIGS. 1a and 1b, another benefit of electric motor(s) 30 is similar to one of the above-described benefits of the torque converter assembly 23, namely the bleed-off of energy in the event of a deadhead event emanating from the external load 14. Specifically, in some embodiments, power from the external power source 12 may be terminated, which can result in a deadhead event where an external load 14 is a non-inertial system. In such case, energy from such a deadhead event is transferred back along transmission driveshaft 21. Electric motors 30 via electric drive gearset 24 can be utilized to bleed off this energy, as opposed to having the energy transferred back to the external power source 12, which could still be winding down. Where electric motor(s) 30 are disposed to function as electric generators, such bleed-off energy can be utilized to generate electricity during a deadhead event. Thus, similar to a gear change event, when the driving power from external power source 12 is terminated, coupling to the external power source 12 is disengaged and coupling to the electric motor(s) 30 is engaged.

Figure 1C:
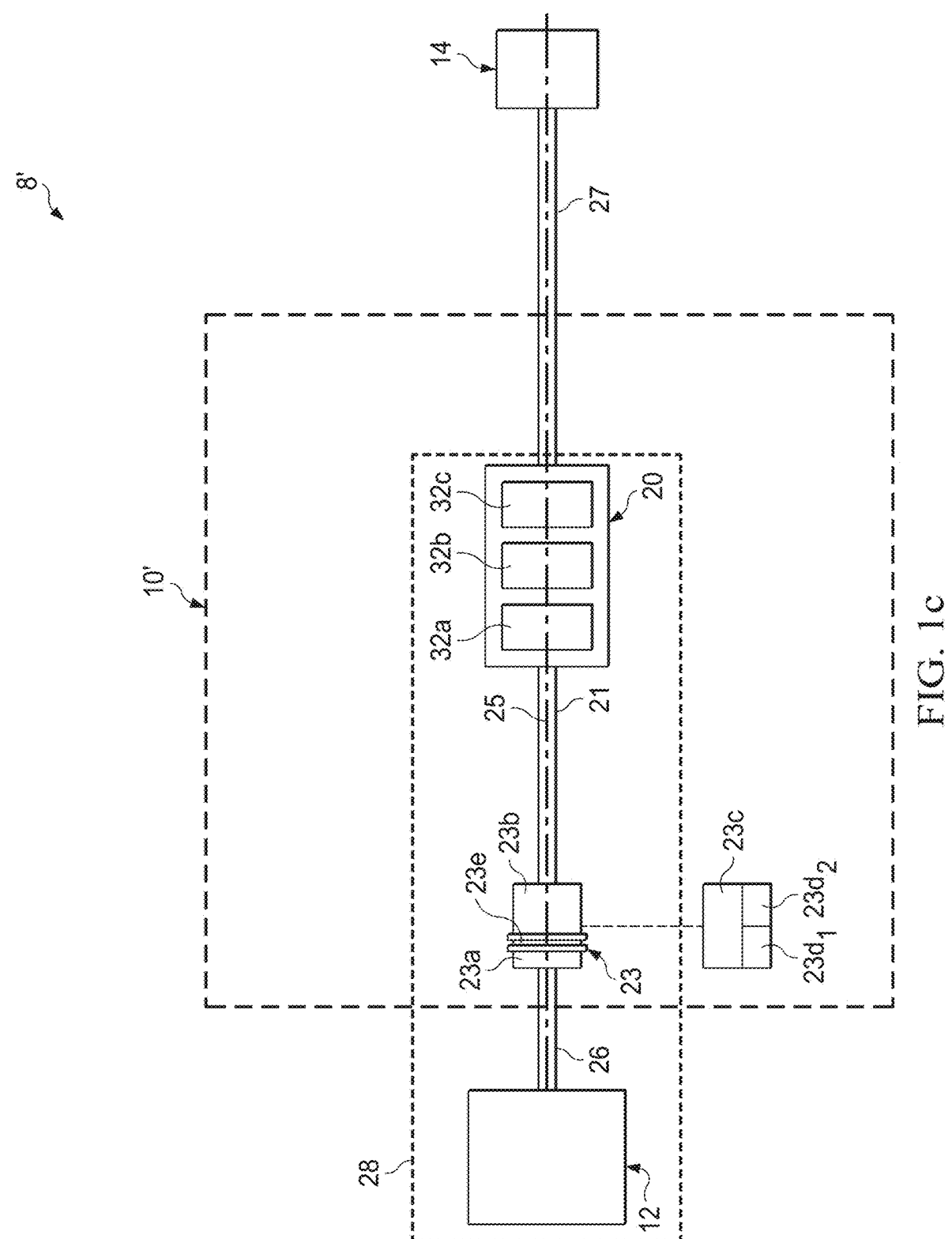
FIG. 1c illustrates a hydraulic fracturing transmission assembly having an adjustable torque converter.

With reference to FIG. 1c, another embodiment of a transmission assembly 10' is illustrated and focuses on torque converter assembly 23 in a hydraulic fracturing system 8'. It will be appreciated that the torque converter assembly 23 shown in FIG. 1c can be utilized in any of the transmission assemblies described herein. Moreover, the torque converter assembly 23 shown in FIG. 1c need not be utilized with electric motors at all as described herein, but may also function equally well in more traditional driveline assemblies, regardless of the external power source utilized. In any event, with reference to transmission assembly 10', the fluid characteristics, such as fluid volume or fluid level or even fluid type, within torque converter assembly 23 can be optimized to maximize the energy transfer between the stator assembly 23b and the impeller assembly 23a, one or both of which may be partially or fully enclosed to defining a primary fluid reservoir 23e. Adjusting the fluid characteristics within torque converter assembly 23 will change the power transfer. For example, if stator assembly 23b is rotated in a direction opposite to the normal direction of operation, this would create a negative torque transfer, which isn't optimal. Reducing the fluid volume within primary fluid reservoir 23e of the torque converter assembly 23 will minimize this negative impact. Thus, in some embodiments, a pump 23c in fluid communication with primary fluid reservoir 23e may be utilized to change a fluid characteristic in torque converter assembly 23 in order to adjust torque transfer. Pump 23c may also be in fluid communication with a fluid supply reservoir 23d and utilized to increase or decrease the fluid level or volume or type in torque converter assembly 23 on demand. In one or more embodiments, such fluid characteristic adjustments may be made in real time during operation of external load 14 so that pump 23c can be used to make adjustments to torque transferred from external power source 12 to external load 14 on the fly. In one or more embodiments, the fluid is transmission oil. In one or more embodiments, torque converter assembly 23 may include two or more fluid supply reservoirs 23d1 and 23d2, where each fluid supply reservoir 23d1 and 23d2 has a fluid with a different characteristic, such as different densities or different heat transfer capabilities. In such case, depending on a particular need, a first fluid from first fluid supply reservoir 23d1 may be pumped or a second fluid from second fluid supply reservoir 23d2 may be pumped to primary fluid reservoir 23e. Thus the fluid supply reservoir 23d1 may have a first fluid with a first fluid characteristic and the fluid supply reservoir 23d2 may a second fluid with a second fluid characteristic that is different than the first fluid characteristic.

For clarity, torque converters 23 utilizing one or more pumps 23c to alter fluid levels withing the torque converter assembly 23 in order to manage torque as described in this paragraph may be utilized in any type of drive system coupling an external power source 12 to an external load 14 and is not limited to use with electric motor or any particular type of drive train gear assembly 20. For example, the transmission assembly 10' shown in FIG. 1c need not included electric motors 30 as described herein.

Figure 2:
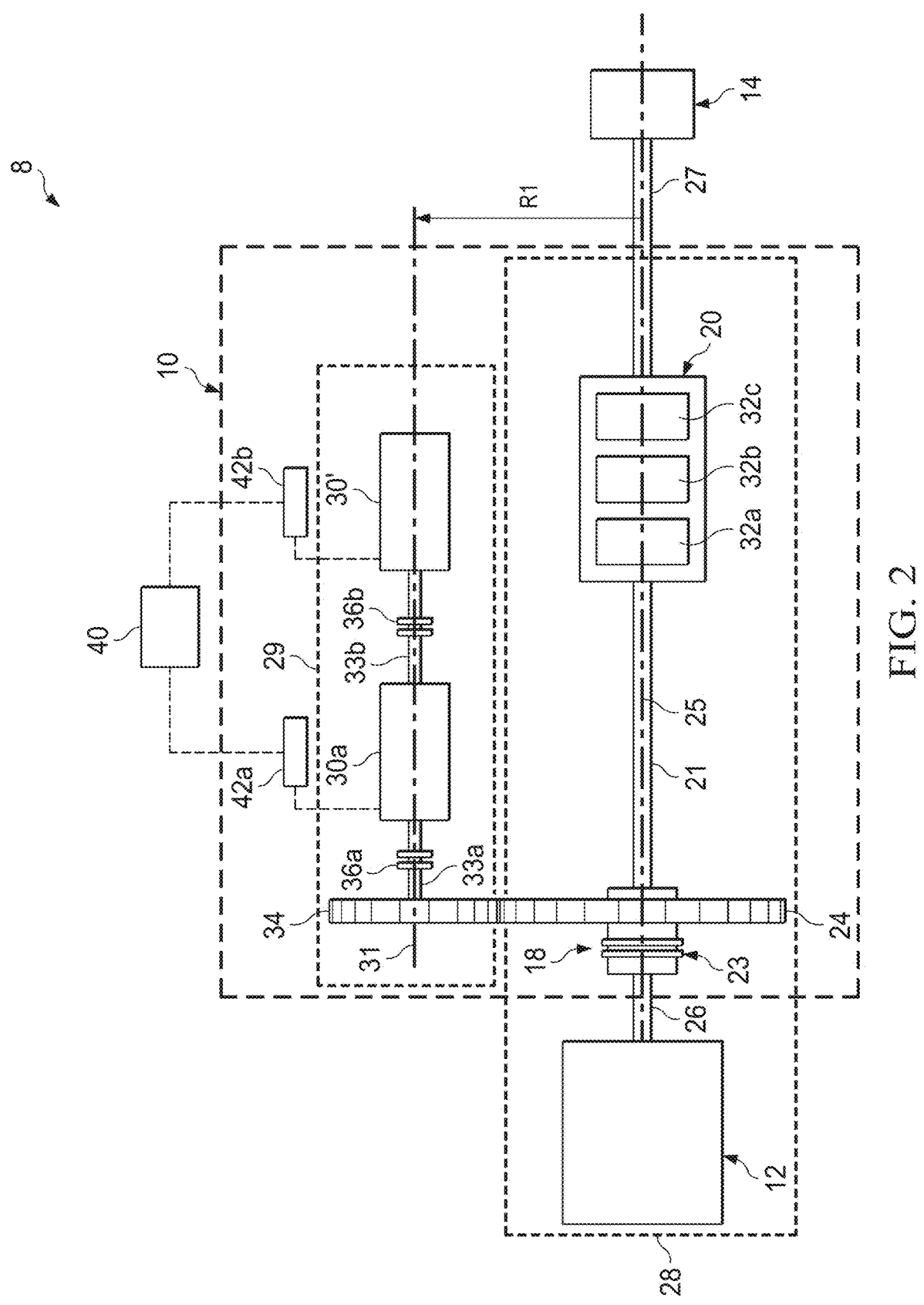
FIG. 2 illustrates a hybrid hydraulic fracturing system having a hybrid electric transmission assembly with serially arranged electric motors radially offset from the primary driveline.

The hybrid electric transmission assembly 10 of FIG. 2 is similar to the hybrid electric transmission assembly 10 of FIG. 1a, but secondary drivetrain 29 includes a secondary or additional electric motor 30'. In one or more embodiments, secondary or additional electric motor 30' may be disposed in series to provide power to primary electric drive gearset 24. For example, electric motor 30a may be a first axial flux electric motor and additional electric motor 30' may be a second axial flux electric motor where the axial flux electric motors are arranged in series. Unless otherwise stated, components and functions of numbered parts in FIG. 2 is similar to those descriptions above with respect to FIGS. 1a and 1b, which discussion is incorporated herein.

In some embodiments, output from electric motor 30a may be supplemented by additional electric motor 30', increasing the overall power or torque output of the motors.

In other cases, electric motor 30a and additional electric motor 30' may have different outputs and can be utilized in the alternative.

In yet other embodiments, electric motor 30a and additional electric motor 30' may serve different functions. For example, electric motor 30a may be disposed to operate at a first speed and additional electric motor 30' may be disposed to operate at a second speed different from electric motor 30a. Or alternatively, as described below, electric motor 30a may be used to provide operative power to drive external load 14 during operation thereof, whereas additional electric motor 30' may be used to provide incremental angular adjustments to output driveshaft 27 for precise control of external load 14, such as might be needed during repair of external load 14. In such case, electric motor 30a may be a servo motor, suited for high speed, high torque applications, while additional electric motor 30' may be a stepper motor disposed for precise angular positioning.

In one or more embodiments, an intermediate driveshaft 33b extends along axis 31 and couples secondary electric motor 30' to primary electric motor 30a and electric output shaft 33a. As such, in some embodiments, secondary electric motor 30' is coaxial with primary electric motor 30a.

In this regard, in addition to engagement mechanism 36a, an additional engagement mechanism 36b is provided to selectively couple and decouple additional electric motor 30' with electric motor 30a and output gearset 34, as desired.

Additional engagement mechanism 36b may be disposed along intermediate driveshaft 33b.

Likewise, additional electric motor 30' may be controlled by its own electric inverter 42b separate and apart from electric inverter 42a controlling electric motor 30a.

In this embodiment, electricity source 40 is shown providing electricity to each electric motor 30 and additional electric motor 30' via respective separate electric inverters 42a, 42b.

Figure 12A:
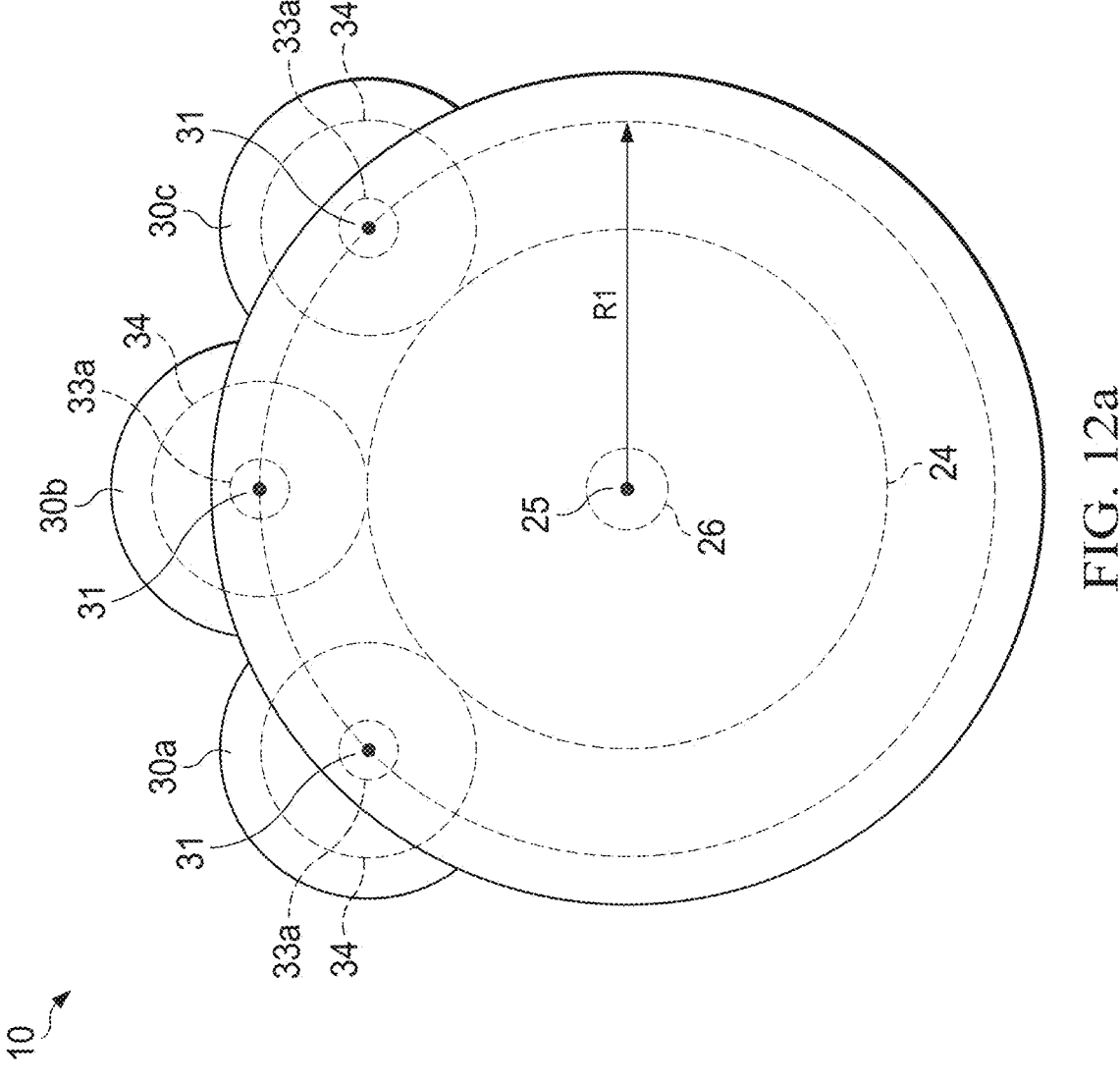
FIG. 12a is an axial view of one embodiment of multiple electric motors radially offset from the primary driveline of a hybrid hydraulic fracturing system having a hybrid electric transmission assembly.
Figure 12B:
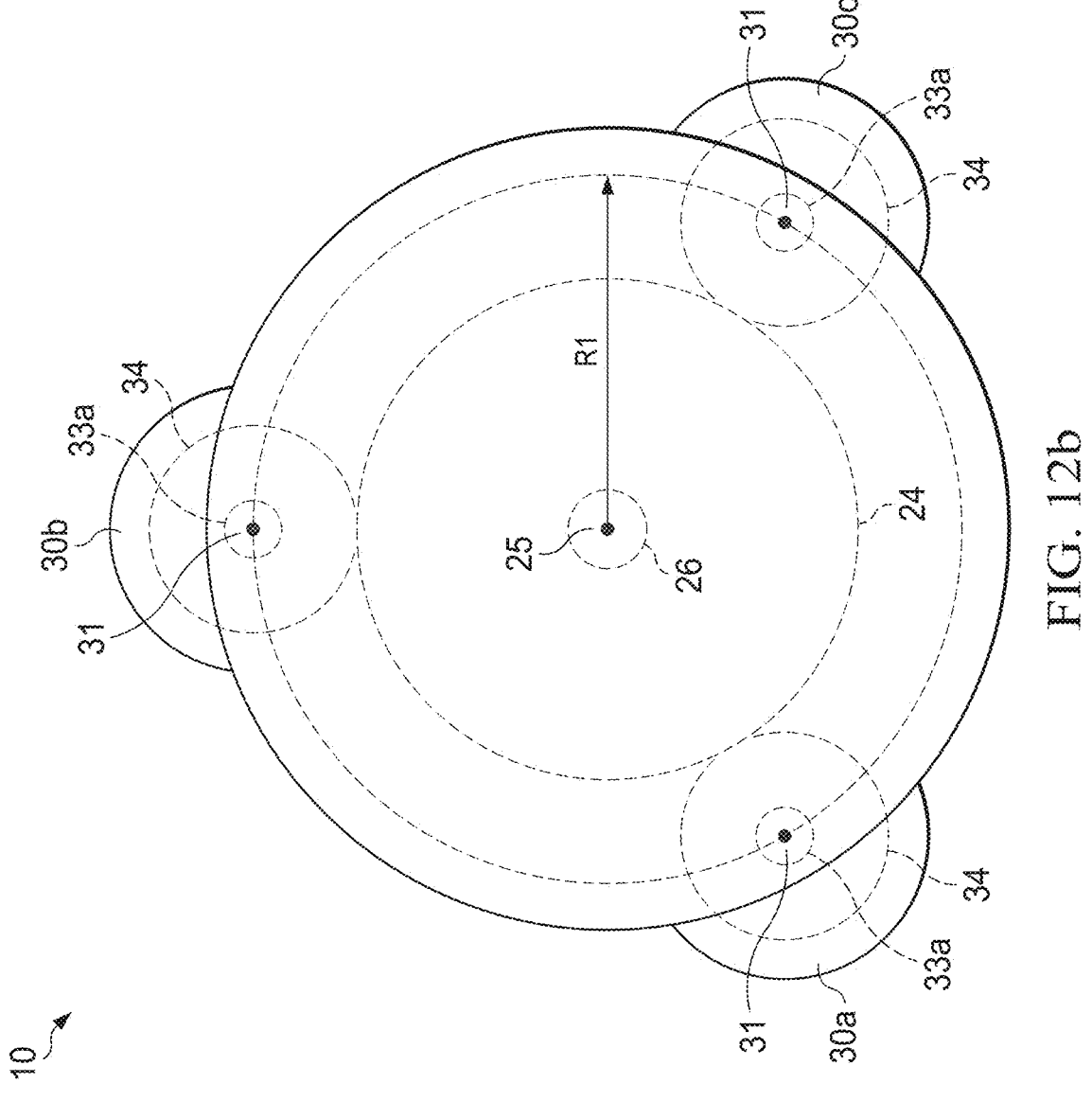
FIG. 12b is an axial view of another embodiment of multiple electric motors radially offset from the primary driveline of a hybrid hydraulic fracturing system having a hybrid electric transmission assembly.
Figure 12C:
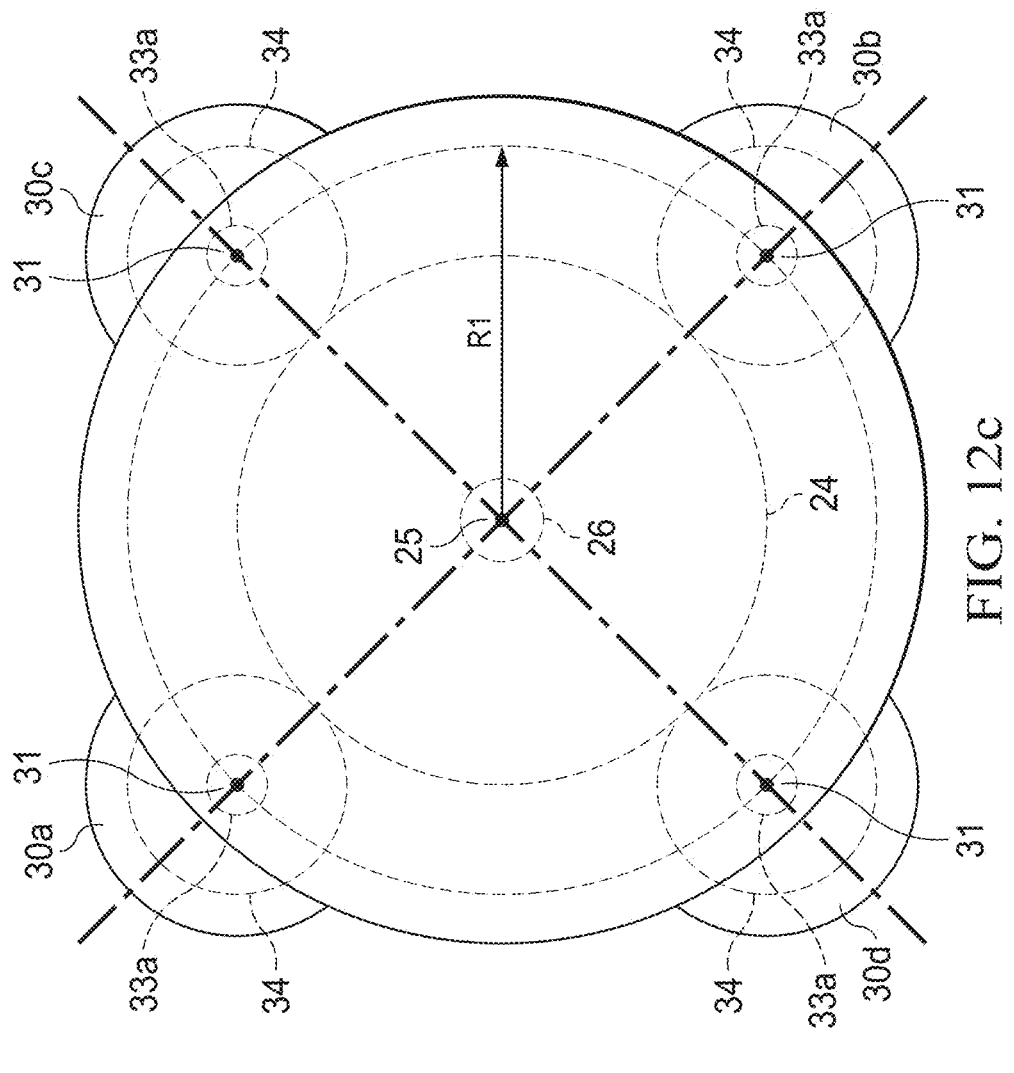
FIG. 12c is an axial view of yet another embodiment of multiple electric motors radially offset from the primary driveline of a hybrid hydraulic fracturing system having a hybrid electric transmission assembly.

In one or more of the foregoing embodiments of FIGS. 1a, 1b or 2, the electric motor(s) 30 are positioned radially outward from transmission primary axis 25 along which power input driveshaft 26 extending from external power source 12 is positioned. This can allow multiple electric motors 30 to be utilized to provide power to electric drive gearset 24, as illustrated in FIGS. 12a-12c.

Figure 3:
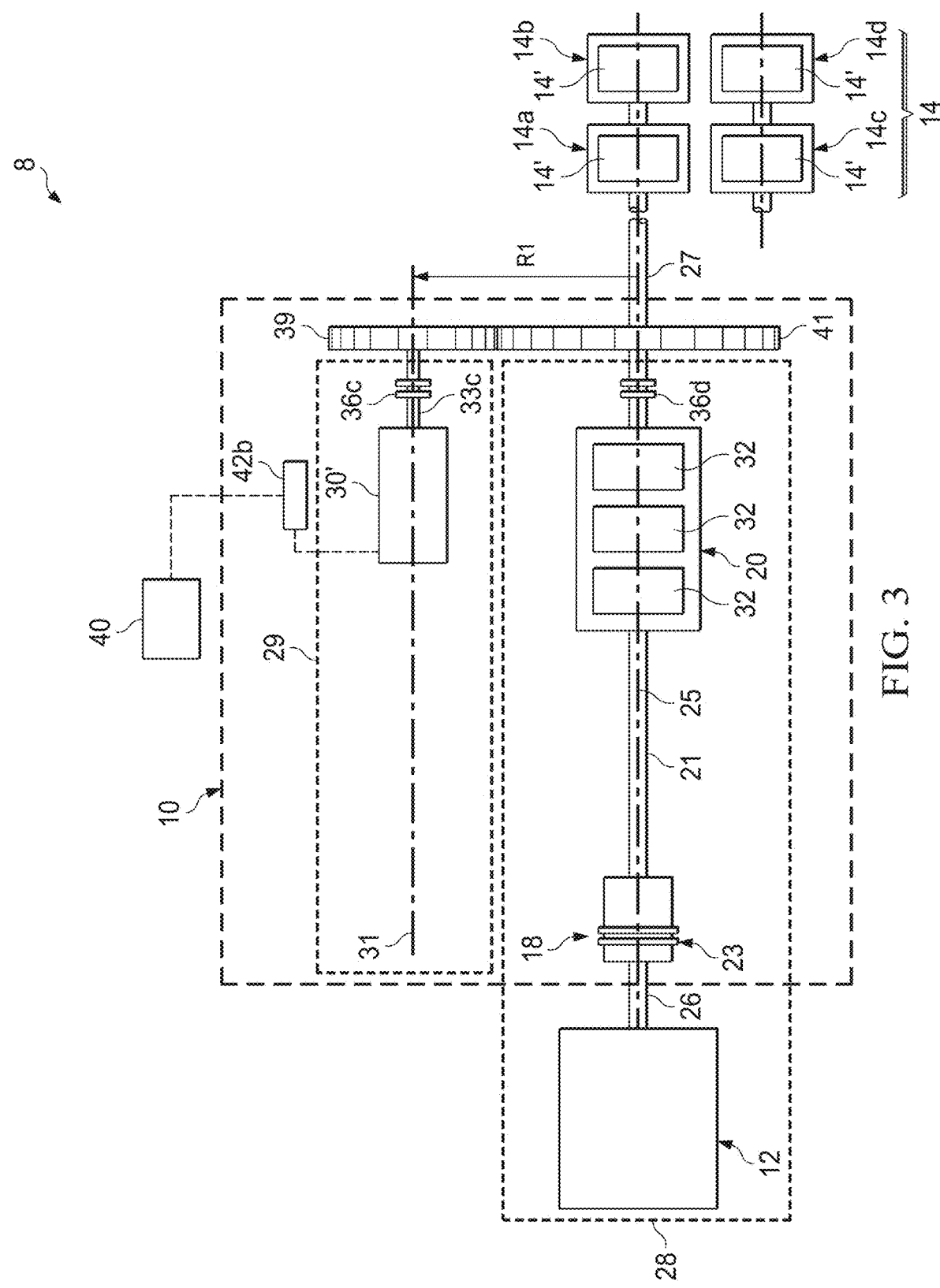
FIG. 3 illustrates a hybrid hydraulic fracturing system having a hybrid electric transmission assembly with an electric motor disposed to bypass the primary drive train gear assembly of the hybrid electric transmission assembly.

FIG. 3 illustrates another embodiment of hybrid electric transmission assembly 10 in which one or more electric motor(s) 30' are coupled directly to output driveshaft 27, bypassing the drive train assembly 20. Unless otherwise stated, components and functions of numbered parts in FIG. 3 is similar to those descriptions above with respect to FIGS. 1-2, which discussion is incorporated herein.

Optionally, external power source 12, input driveshaft 26, engagement mechanism 22, transmission driveshaft 21, drive train gear assembly 20 and output driveshaft 22 are arranged along primary axis 25 and represent a primary drivetrain 28, while one or more electric motor(s) 30' are disposed along a separate electric motor axis 31 and represents a secondary drivetrain 29 that is parallel with but spaced radially apart from primary axis 25 so as to be radially offset therefrom. In one or more embodiments, hybrid electric transmission assembly 10 of FIG. 3 may have a plurality of secondary drivetrains 29, each having an electric motor axis 31 with one or more electric motor(s) 30' disposed therealong.

Each secondary electric motor 30' includes a secondary electric output shaft 33c extending along electric motor axis 31 and along which an output gearset 39 is disposed. In some embodiments, output gearset 39 may be a gear mounted on secondary output shaft 33c. Output gearset 39 in turn is coupled to a supplemental electric drive gearset 41 to operate drive output driveshaft 27 while bypassing drive train assembly 20. In one or more embodiments, supplemental electric drive gearset 41 may be a planetary gearset, while in other embodiments, supplemental electric drive gearset 41 may be one or more spur gears.

An engagement mechanism 36c may be provided along output shaft 33c to selectively engage and disengage electric motor 30' from output gearset 39. In some embodiments, it may be desirable to actuate engagement mechanism 36c to disengage and selectively isolated electric motor 30' from output driveshaft 27 when external power source 12 is driving external load 14.

In yet other embodiments, it may be desirable to actuate engagement mechanism 36c to be engaged so that output driveshaft 27, through output gearset 39 and supplemental electric drive gearset 41, can be used not only to drive external load 14, but also to drive electric motor 30'. In this regard, electric motor 30' may be a generator, and used to produce electricity for delivery to electricity source 40 (such as a battery) or other to other electrical equipment as described herein. It will be appreciated that in such embodiments, electric motor 30' becomes part of the overall load that is driven by external power source 12 and thus, primary drive train gear assembly 20 is also used to moderate power transmission to electric motor 30'. This avoids placing any additional load on external power source 12 upstream of the primary drive train gear assembly 20.

Engagement mechanism 36d may be provided to decouple primary drive train gear assembly 20 from output driveshaft 27 when electric motor 30' is used to provide power to output driveshaft 27. In this way, primary drive train gear assembly 20 is selectively isolated from external load 14 and will not inhibit power output from electric motor 30'. In one or more embodiment, engagement mechanism 36d may include any of the engagement mechanisms disclosed herein.

Notably, where an electric drive gearset 41 is provided as illustrated between the external load 14 and primary drivetrain assembly 20, it is desirable to include at least engagement mechanism 36d to disengage coupling between primary drivetrain assembly 20 and the electric drive gearset 41 so that the bypass function can be achieved as described herein. In addition, engagement mechanism 36a and engagement mechanism 36c may be provide to isolate electric motor 30 so that power can be passed from electric motor 30 along a select power transfer path, namely either through the primary drivetrain assembly 20 or bypassing the primary drivetrain assembly 20. Thus, engagement mechanism 36a is disposed between the electric motor 30 and the input driveshaft 26, while engagement mechanism 36c is disposed between the electric motor 30 and the output driveshaft 27 and engagement mechanism 36d is disposed between is along the output driveshaft 27 between the electric gearset 41 and the primary drivetrain assembly 20.

In one or more embodiment, engagement mechanism 36d may be torque converter similar to torque converter assembly 23, thereby preventing torque from being passed back to primary drive train assembly 20.

Thus, additional electric motor 30' may be utilized to directly power external load 14 for directly driving external load 14, bypassing primary drive train assembly 20.

In the alternative, or in addition thereto, in one or more embodiments, additional electric motor 30' may be utilized during maintenance of external loads 14. For example, in one or more embodiments, external load 14 may include external load components 14' that require regular maintenance and or replacement. For example, components 14' may be valve heads or valve seats where external load 14 is a hydraulic fracturing pump. Regardless of the external load, in order for such maintenance operations to take place, the components 14' must be incrementally moved. Incremental movement of the components 14', such as valve heads in a hydraulic fracturing pump, is accomplished by incrementally rotating the external load driveshaft (not shown). This may be only a partial angular rotation of the external load driveshaft or only several rotations of the external load driveshaft in order to position the components 14' for such maintenance. Additional electric motor 30' may be used to provide such incremental angular adjustments to output driveshaft 27 for precise control of external load 14. Thus, in some embodiments, additional electric motor 30' may be a stepper motor. It will be appreciated that the ability to more precisely control electric motor 30' provides a benefit over using external power source 12 to provide such axial rotation. This is particularly true where electric motor 30' is coupled more directly to external load 14, bypassing drive train assembly 20.

Also shown in FIG. 3 are a plurality of external loads 14, namely external loads 14a, 14b, 14c and 14d. In one or more embodiments, external loads may be different hydraulic fracturing pumps. In one or more embodiments, an internal combustion engine 12 may be utilized to operate a first plurality of hydraulic fracturing pumps 14a, 14b (or other loads), while electric motor 30' is utilized to operate a second plurality of hydraulic fracturing pumps 14c, 14d (or other loads).

In one or more embodiments, supplemental electric drive gearset 41 may be coaxial with output driveshaft 27 along transmission primary axis 25. Likewise, engagement mechanism 36d may be coaxial about transmission primary axis 25.

The hybrid electric transmission assembly 10 shown in FIG. 3 may also be utilized to phase shift the gearsets 32 of the primary drive train gear assembly 20 in order to overclock the main transmission output, thereby increasing the output torque of the primary drive train gear assembly 20. In such configuration, supplemental electric drive gearset 41 may be an additional planetary gearset to the planetary gearsets 32 of drive train assembly 20.

The hybrid electric transmission assembly 10 shown in FIG. 3 may also be utilized to achieve a torque or horsepower output that is greater than the torque or horsepower rating of drive train assembly 20, it being understood that horsepower never changes through gear shifts, rather, only an increase or decrease in torque. In this regard, the original gear assembly 20 may be torque limited by design. Maximizing the torque through the gear assembly 20 and distributing additional torque directly to the output gives a torque addition to the external load 14 greater than drive train assembly 20 can deliver.

Although not necessary in the embodiments of FIG. 3, in one or more embodiments, the electric motor(s) 30' are positioned radially outward from transmission primary axis 25 along which power input driveshaft 26 extending from external power source 12 is positioned. This can allow multiple electric motors 30 to be utilized to provide power to electric drive gearset 41, similar to illustrated FIGS. 12a-12c with respect to electric drive gear 24.

Figure 4A:
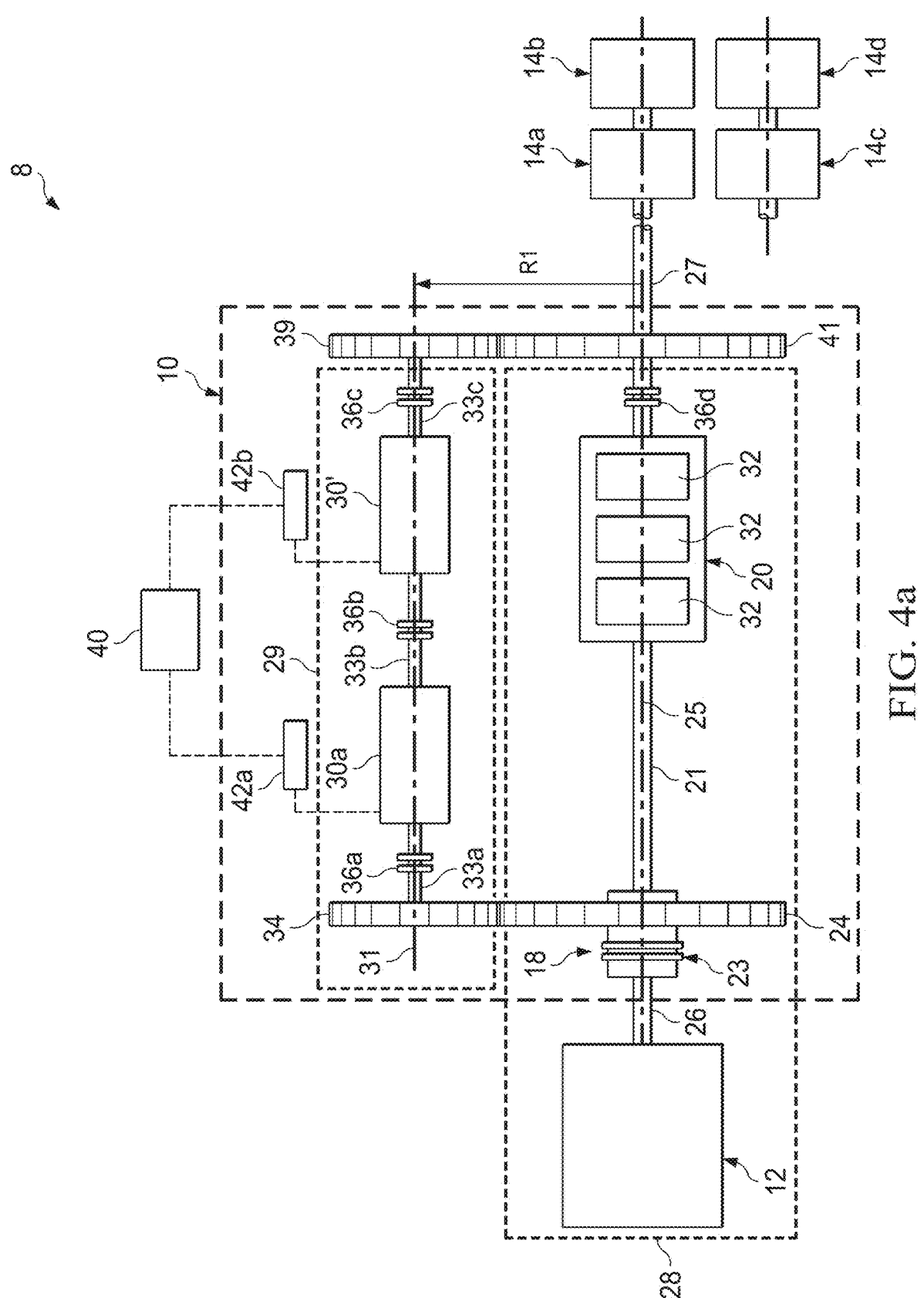
FIG. 4a illustrates a hybrid hydraulic fracturing system having a hybrid electric transmission assembly with serially arranged electric motors disposed to either power primary drive train gear assembly or bypass primary drive train gear assembly.
Figure 4B:
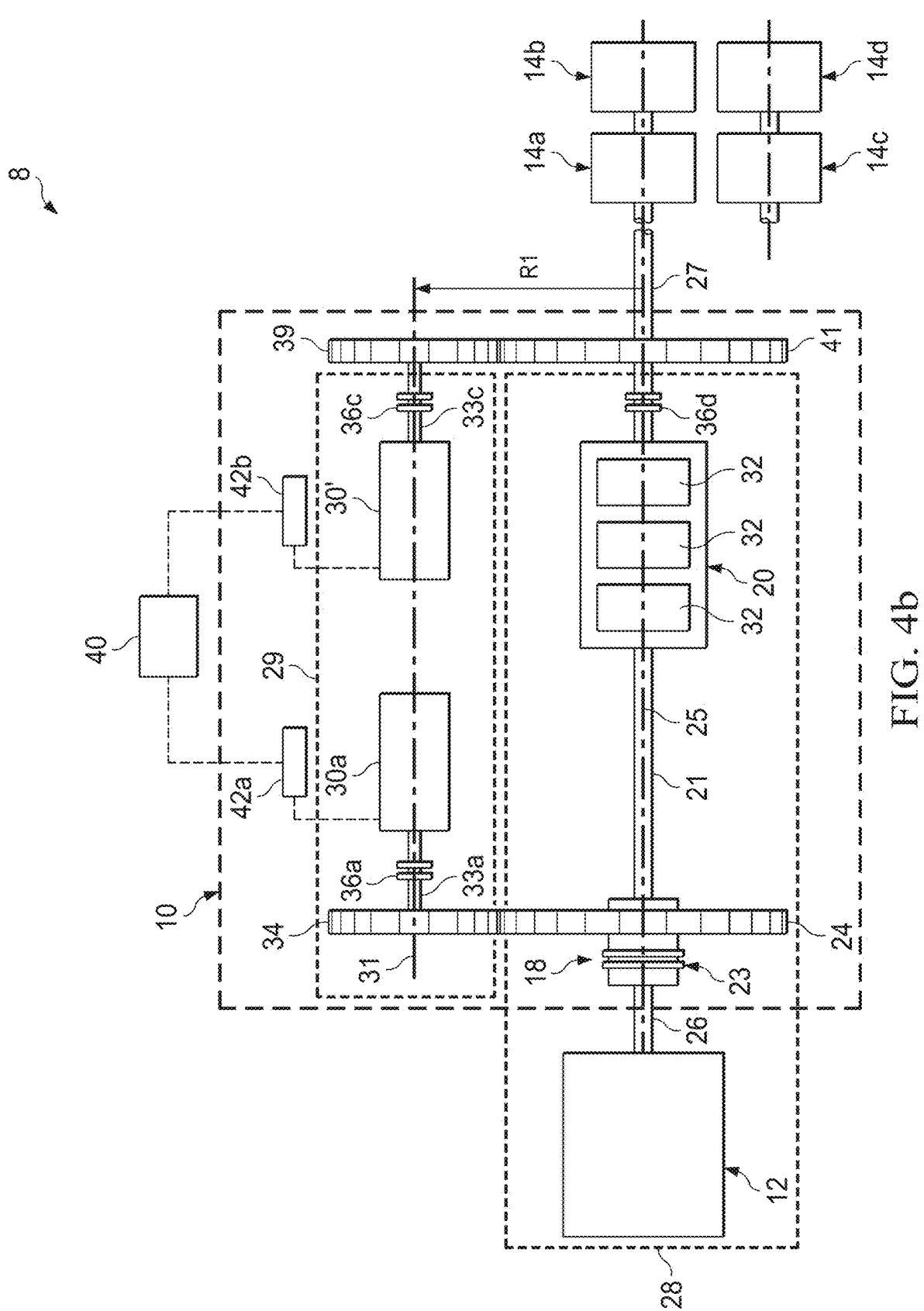
FIG. 4b illustrates a hybrid hydraulic fracturing system having a hybrid electric transmission assembly with electric motors disposed to either power primary drive train gear assembly or bypass primary drive train gear assembly.

The hybrid electric transmission assembly 10 disclosed in FIGS. 4a and 4b are similar to FIGS. 1a, 1b, 2 and 3, but combine the primary electric drive motor(s) 30a described in FIGS. 1a and 1b with the secondary electric drive motor(s) 30' described in FIGS. 2 and 3, further enhancing operational functionality of embodiments of the hybrid electric transmission assembly 10. Unless otherwise stated, components and functions of numbered parts in FIGS. 4a and 4b are similar to those descriptions above with respect to FIGS. 1a, 1b, 2 and 3, which discussion is incorporated herein.

In FIG. 4a, secondary electric motor(s) 30' may be utilized to provide power through intermediate driveshaft 33b as described above in FIG. 2. In such case, secondary or additional electric motor 30' may be disposed in series with primary electric drive motor 30*a* to provide power to primary electric drive gearset 24.

In some embodiments, output from electric motor 30*a* may be supplemented by additional electric motor 30', increasing the overall power or torque output of the motors to primary electric drive gearset 24. In such case, engagement mechanism 36*c* is decoupled. In other cases, electric motor 30*a* and additional electric motor 30' may have different outputs and can be utilized in the alternative as described above to provide power to primary electric drive gearset 24.

Addition engagement mechanism 36*b* is provided to selectively couple and decouple additional electric motor 30' and electric motor 30*a*. In this regard, each of engagement mechanisms 36*a*, 36*b* and 36*c* can be selectively coupled and decoupled depending on the desired use of electric motor 30*a* and additional electric motor 30'. For example, engagement mechanisms 36*a* and 36*b* can be coupled while engagement mechanism 36*c* is decoupled so that power from electric motor 30*a* and additional electric motor 30' can be passed through output drive gear 34. In another illustrative example, engagement mechanisms 36*b* and 36*c* can be coupled while engagement mechanism 36*a* is decoupled so that power from electric motor 30*a* and additional electric motor 30' can be passed through output gearset 39, bypassing primary drive train gear assembly 20 and allowing electric motor 30*a* and additional electric motor 30' to directly couple to external load 14 as described above with respect to FIG. 3. In yet another illustrative example, engagement mechanism 36*b* can be decoupled so electric motor 30*a* and additional electric motor 30' operate independently of one another, where electric motor 30*a* can be operated as described above with respect to FIG. 1 and additional electric motor 30' can be operated as described above with respect to FIG. 3.

It will be appreciated that depending on the desired function of electric motor 30*a* and additional electric motor 30', in some embodiments, these motors may be the same type of motor while in other embodiments, electric motor 30*a* and additional electric motor 30' may be different types of electric motors. For example, one motor may be a servo motor and the other may be a stepper motor.

In FIG. 4*b*, primary electric motor(s) 30*a* is operated independently of secondary electric motor(s) 30'. In such an arrangement, primary electric motor(s) 30*a* and secondary electric motor(s) 30' may be utilized to align gears for meshing within primary drive train gear assembly 20 in order to optimize the speed by which gears within primary drive train gear assembly 20 can be change and minimize gear backlash within primary drive train gear assembly 20. For example, when aligning gears, the speed of primary electric motor(s) 30*a* may be faster than the speed of secondary electric motor(s) 30' in order to ensure gears are in phase for meshing. In such embodiments, both primary electric motor(s) 30*a* and secondary electric motor(s) 30' may be stepper motors to allow incremental adjustments necessary to achieve a high degree of meshing, thereby avoiding backlash among other things.

Relatedly, primary electric motor(s) 30*a* and secondary electric motor(s) 30' may be operated at different speeds to achieve various results as described herein with respect to FIGS. 1, 3 and 4*a*. Torque can be used to control the position of the motor and therefore the result of the connected mechanism while speed is used to control the velocity. There can be a strategy where speed and torque are used collectively in the same system on different motors to give a given desired speed while the torque controlled motors apply a constant and equal torque on the system.

Figure 5:
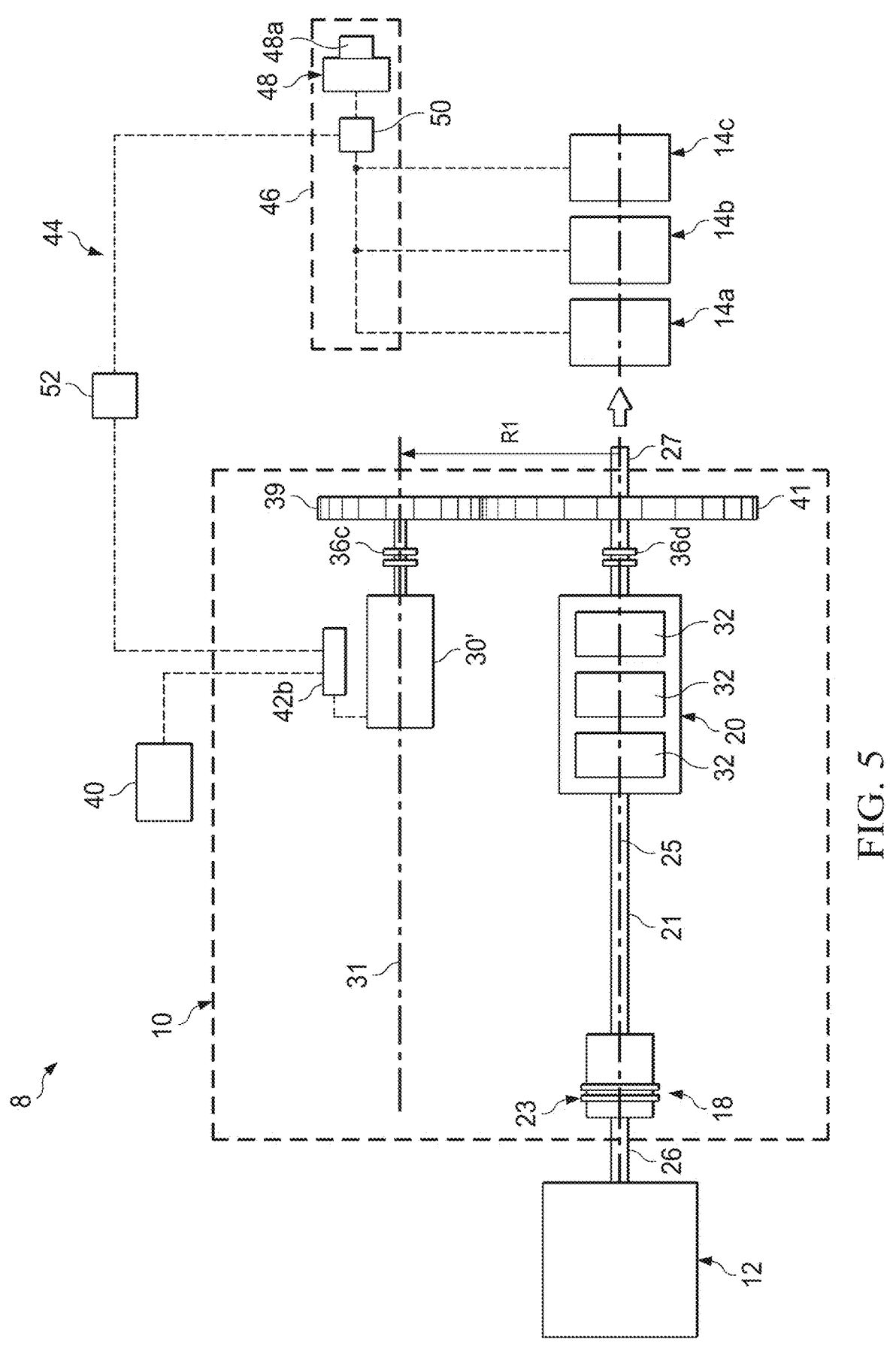
FIG. 5 illustrates a hybrid hydraulic fracturing system having a hybrid electric transmission assembly with bypass electric motors disposed to pressure test a hydraulic fracturing system.

FIG. 5 illustrates another embodiment of hybrid electric transmission assembly 10 as described in FIG. 3, but where electric motor(s) 30' are used in combination with a feedback loop 44 to pressure test downstream fluidic connections/equipment 46 (generally depicted by the dashed box) between one or more hydraulic fracturing pumps 14*a*, 14*b*, 14*c* and a wellhead 48. Feedback loop 44 includes one or more sensors 50 and a controller 52. Controller 52 is utilized to operate electric motor(s) 30' either directly or through inverter 42*b*.

It will be appreciated that there is a need to pressure test connections/equipment 46 from time to time during pumping operations, particularly in high pressure pumping operations as is common in hydraulic fracturing. In such pressure test operations, typically the wellhead 48 or other valve 48*a* is closed and the one or more hydraulic fracturing pumps 14*a*, 14*b*, 14*c* are utilized to increased the pressure applied to the fluidic connections/equipment 46. To ensure that the pressure testing operations do not damage fluidic connections/equipment 46, additional electric motor 30' is used to precisely increase the pressure applied by hydraulic fracturing pumps 14*a*, 14*b*, 14*c*. This is in contrast to the prior art where the internal combustion engine 12 is utilized for such pressure tests. Specifically, it is common in the prior art to perform these pressure test manually by quickly engaging and disengaging the combustion engine 12 from output shaft 27 in an effort to "bump" up the pressure. However, this method of pressure testing can often result in overpressurizing fluidic connections 46 as an operator attempts to reach a maximum test pressure, thereby damaging connections/equipment 46.

Utilizing the feedback loop 44 and electric motor 30' as described allows maximum pressure to be achieved without overpressurizing. In one or more embodiments, one or more sensors 50 are deployed downstream of hydraulic fracturing pumps 14*a*, 14*b*, 14*c* and upstream of wellhead 48 (or alternatively, upstream of a wellbore equipment valve 48*a* otherwise deployed in a wellbore which wellbore equipment valve 48*a* can be closed to created a pressurizeable system). Controller 52 is utilized to monitor the pressure and provide feedback to electric inverter 42*b* and/or electric motor 30' to much more gradually (as compared to the "bump" method of the prior art) increase the pressure produced from hydraulic fracturing pumps 14*a*, 14*b*, 14*c* in order to reach the maximum test pressure, thereby minimizing the likelihood of damage to the connections/equipment 46. Although not necessary, in some embodiments, to further facilitate such pressure testing, electric motor(s) 30' may be stepper motors.

Figure 6:
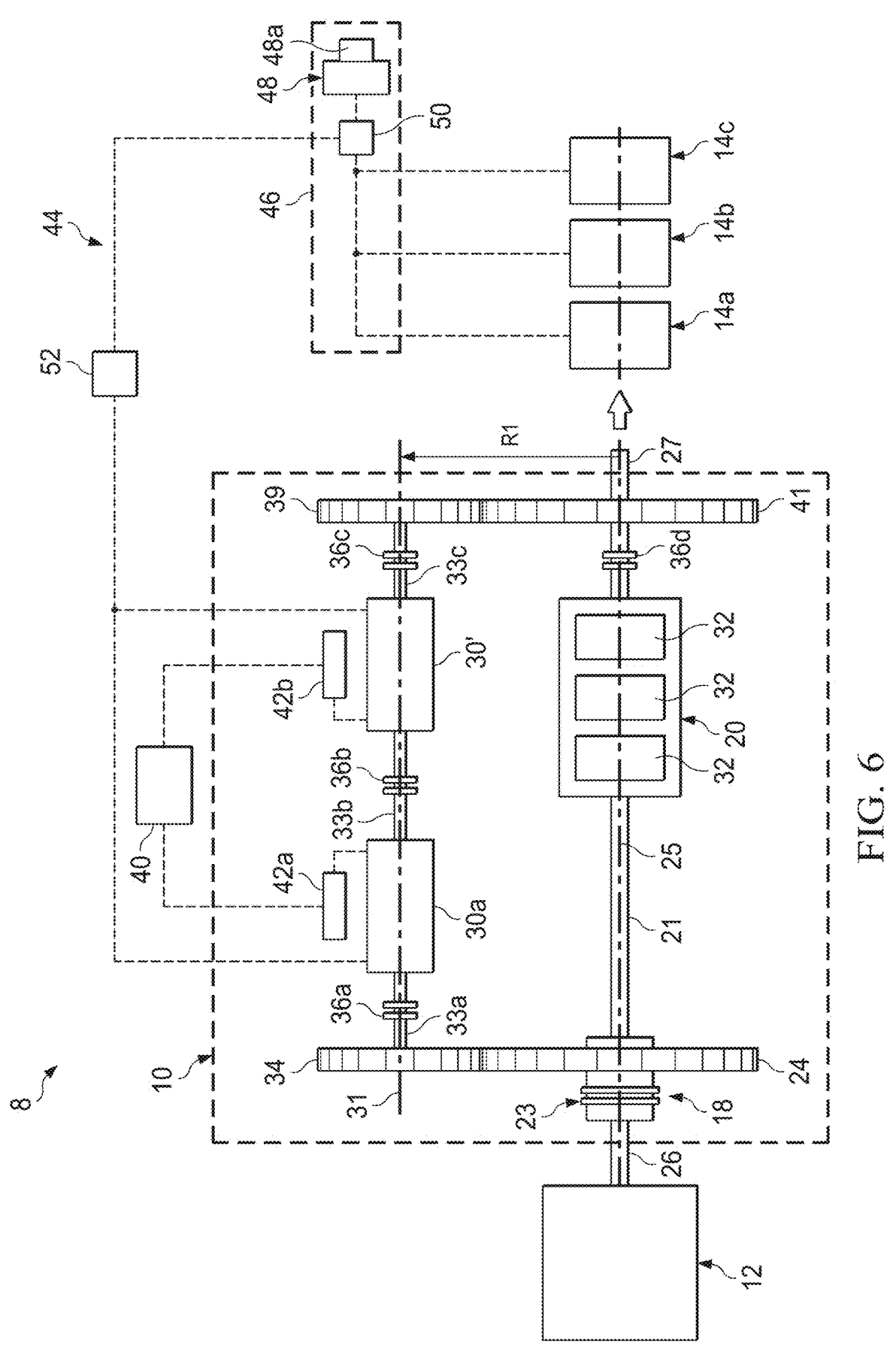
FIG. 6 illustrates a hybrid hydraulic fracturing system having a hybrid electric transmission assembly with a feedback loop to operate a plurality of electric motors.

The hybrid electric transmission assembly 10 of FIG. 6 is similar to FIG. 5, but utilizes feedback loop 44 to control operation of one or more electric motors 30, and thus provides more precise control of pressures downstream of the one or more hydraulic fracturing pumps 14*a*, 14*b*, 14*c*. In this regard, feedback loop 44 includes one or more sensors 50 and a controller 52. Controller 52 in turn may provide feedback to electric motor 30*a* and/or inverter 42*a* to adjust output to primary electric drive gearset 24. In such case, engagement mechanism 36*b* may be utilized to decoupled electric motor 30' from driveshaft 33*a* or engagement mechanism 36*c* may be utilized to decouple electric motor 30' from output gearset 39, allowing electric motor 30' to be provide power to drive shaft 33*a*. Alternatively, engagement mechanism 36*a* may be utilized to decoupled electric motor 30*a* from driveshaft 33*a*, permitting electric motor 30*a* to be utilized to provide power to drive gearset 41, bypassing drive train assembly 20.

In any of the embodiments disclosed herein with respect to any of the figures, drive gearset 41 may be a bull gear, while in other embodiments, drive gearset 41 may be a planetary gearset. Regardless of the type of gearset, it will be appreciated that drive gearset 41 is downstream and separate from the gearset(s) 32 of primary drive train assembly 20 in such embodiments.

In other embodiments, power may be delivered to output driveshaft 27 by both the external power source 12 via drive train assembly 20 as well as the electric motor(s) 30' via electric drive gearset 41.

Figure 7:
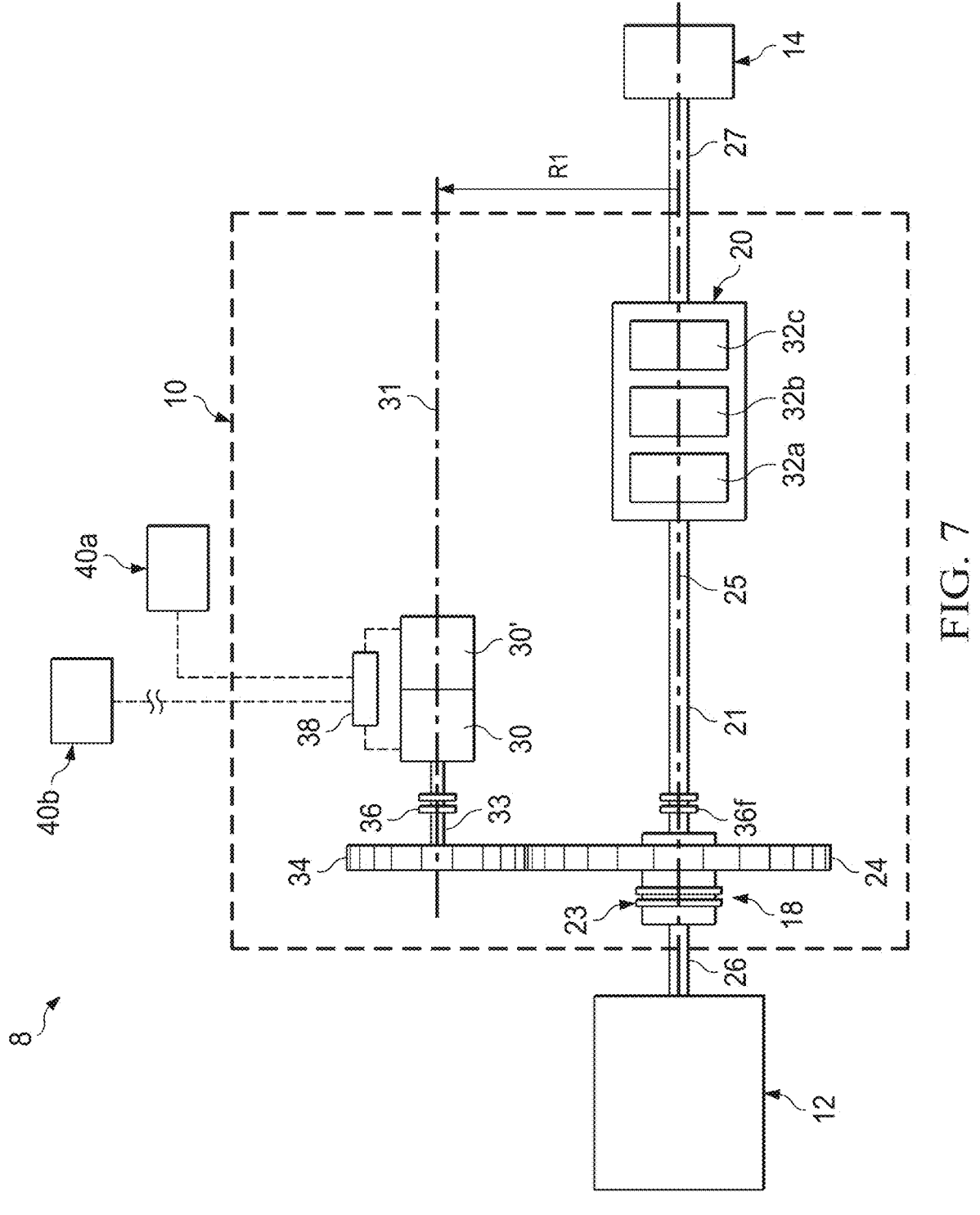
FIG. 7 illustrates a hybrid hydraulic fracturing system similar to FIG. 1a, but where an electric motor can operate as a generator.

The hybrid electric transmission assembly 10 of FIG. 7 is similar to the embodiment of hybrid electric transmission assembly 10 of FIG. 1, but at least one electric motor 30 may also be an electric generator. In this embodiment, when external power source 12 is utilized to provide power to output driveshaft 27, electric motor 30 may be operated as an electric generator to charge battery 40*a* by utilizing input driveshaft 26 to drive gear 34 via gearset 24. Alternatively, an additional electric motor 30' may be provided and function as a generator. It will be appreciated that any generated electricity from electric motors 30, 30' operating as a generator may also be utilized to power external local assets, such as but not limited to, a datavan or hydraulic fracturing blender utilized in conjunction with hydraulic fracturing pumps 14. Alternatively or in addition thereto, electricity generated from electric motor 30 may be utilized to charge batter 40*a* and/or fed back into the electric grid 40*b*.

Figure 8A:
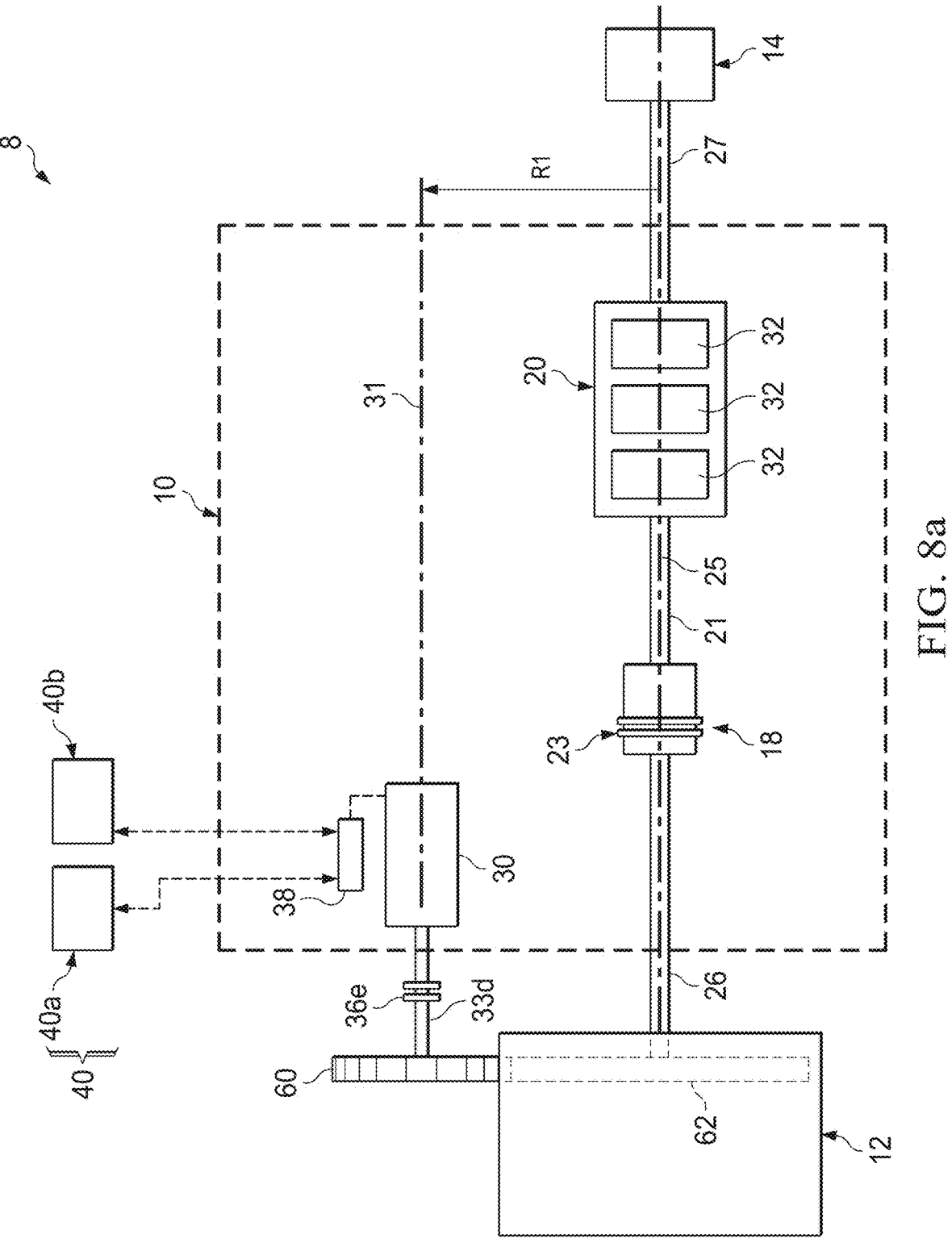
FIGS. 8a and 8b illustrate a hybrid hydraulic fracturing system having a hybrid electric transmission assembly with electric motors disposed to assist an external power source during startup.
Figure 8B:
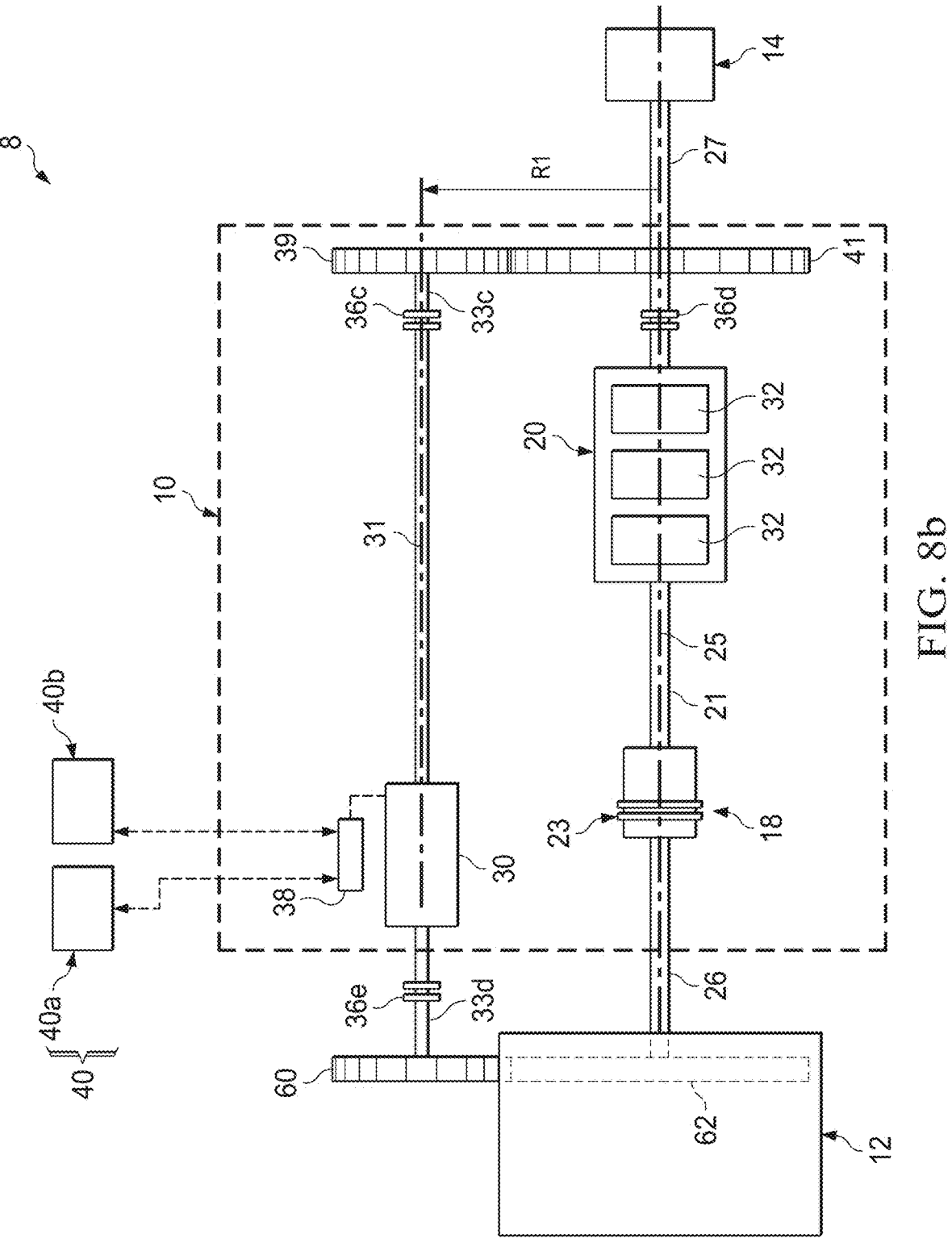

FIGS. 8*a* and 8*b* illustrate other embodiments of the hybrid electric transmission assembly 10 where one or more electric motors 30 of hybrid electric transmission assembly 10 may also be utilized initially to assist external power source 12 during startup.

Notably, FIG. 8*b* combines the functionality of FIG. 3 as described above and which discussion is incorporated herein, with the functionality of FIG. 8*a*.

As shown in FIGS. 8*a* and 8*b*, external power source 12 includes a start gearset 62. Start gearset 62 may be internal or external to external power source 12, and disposed to cause initial rotation of driveshaft 26, either directly or by causing rotation of a crankshaft (not shown) within external power source 12.

In any event, start gearset 62 is meshed with an assist gearset 60 which is driven by electric motor 30. In one or more embodiments, assist gearset 60 may be mounted along a start driveshaft 33*d* which is driven by electric motor 30.

An engagement mechanism 36*e* mounted along start driveshaft 33*d* may be utilized to selectively couple and decouple electric motor 30 from assist gearset 60 and start gearset 62.

Electric motor 30 may be energized either by a battery 40*a* or other electricity source 40*b*, thereby powering start gearset 62 to assist external power source 12 during startup. Thereafter, engagement mechanism 36*e* may be activated to decouple assist gear 60 from electric motor 30.

Alternatively, rather than decouple electric motor 30 from external power source 12, electric motor 30 may be an electric alternator and external power source 12 may be used to drive electric motor 30 to produce electricity.

In any event, while in some embodiments electric motor 30 may be utilized only to assist in startup of external power source 12, in other embodiments, electric motor 30 may also have functionality as described in FIG. 3 herein. Thus, in FIG. 8*b*, one or more electric motor(s) 30 may be selectively coupled directly to output driveshaft 27 and utilized to directly power external load 14 for directly driving external load 14, bypassing the drive train assembly 20.

Specifically, electric motor 30 includes a secondary electric output shaft 33*c* extending along electric motor axis 31 and along which an output gearset 39 is disposed. Output gearset 39 in turn is coupled to a supplemental electric drive gearset 41 to operate drive output driveshaft 27 while bypassing drive train assembly 20. In one or more embodiments, supplemental electric drive gearset 41 may be a planetary gearset, while in other embodiments, supplemental electric drive gearset 41 may be one or more spur gears.

An engagement mechanism 36*c* may be provided along output shaft 33*c* to selectively engage and disengage electric motor 30 from output gearset 39. In some embodiments, it may be desirable to actuate engagement mechanism 36*c* to disengage and selectively isolated electric motor 30 from output driveshaft 27, such as when electric motor 30 is utilized in startup of external power source 12 and/or when external power source 12 is driving external load 14.

Similarly, engagement mechanism 36*d* may be provided to decouple primary drive train gear assembly 20 from output driveshaft 27 when electric motor 30 is used to provide power to output driveshaft 27. In this way, primary drive train gear assembly 20 is selectively isolated from external load 14 and will not inhibit power output from electric motor 30. In one or more embodiment, engagement mechanism 36*d* may include any of the engagement mechanisms disclosed herein.

In one or more embodiment, engagement mechanism 36*d* may be torque converter similar to torque converter assembly 23, thereby preventing torque from either external load 14 or electric motor 30 from being passed back to drive train assembly 20.

Electric motor 30 shown in FIG. 8*b* may be utilized for any of the functionality described with respect to FIG. 3, including, without limitation, during a gear change of primary drive train gear assembly 20. In this regard, electric motor 30 may be utilized to provide either equilibrium power to external load 14 during a gear change of primary drive train gear assembly 20 or to provide driving power to external load 14 during a gear change of primary drive train gear assembly 20.

Alternatively, electric motor 30 may be utilized to provide driving power to external load 14 downstream of primary drive train gear assembly 20 as desired for a particular operation, such as when external power source 12 is offline or during repair/maintenance of primary drive train gear assembly 20 or when control algorithms determines that battery or main line electric is available or it is the customers/operators preferred primary power or the most cost efficient power source.

Although not necessary in the embodiments of FIG. 8, in one or more embodiments, the electric motor(s) 30 are positioned radially outward from transmission primary axis 25 along which power input driveshaft 26 extending from external power source 12 is positioned. This can allow multiple electric motors 30 to be utilized to provide power to electric drive gearset 41, similar to illustrated FIGS. 12*a*-12*c* with respect to electric drive gear 24.

Figure 9:
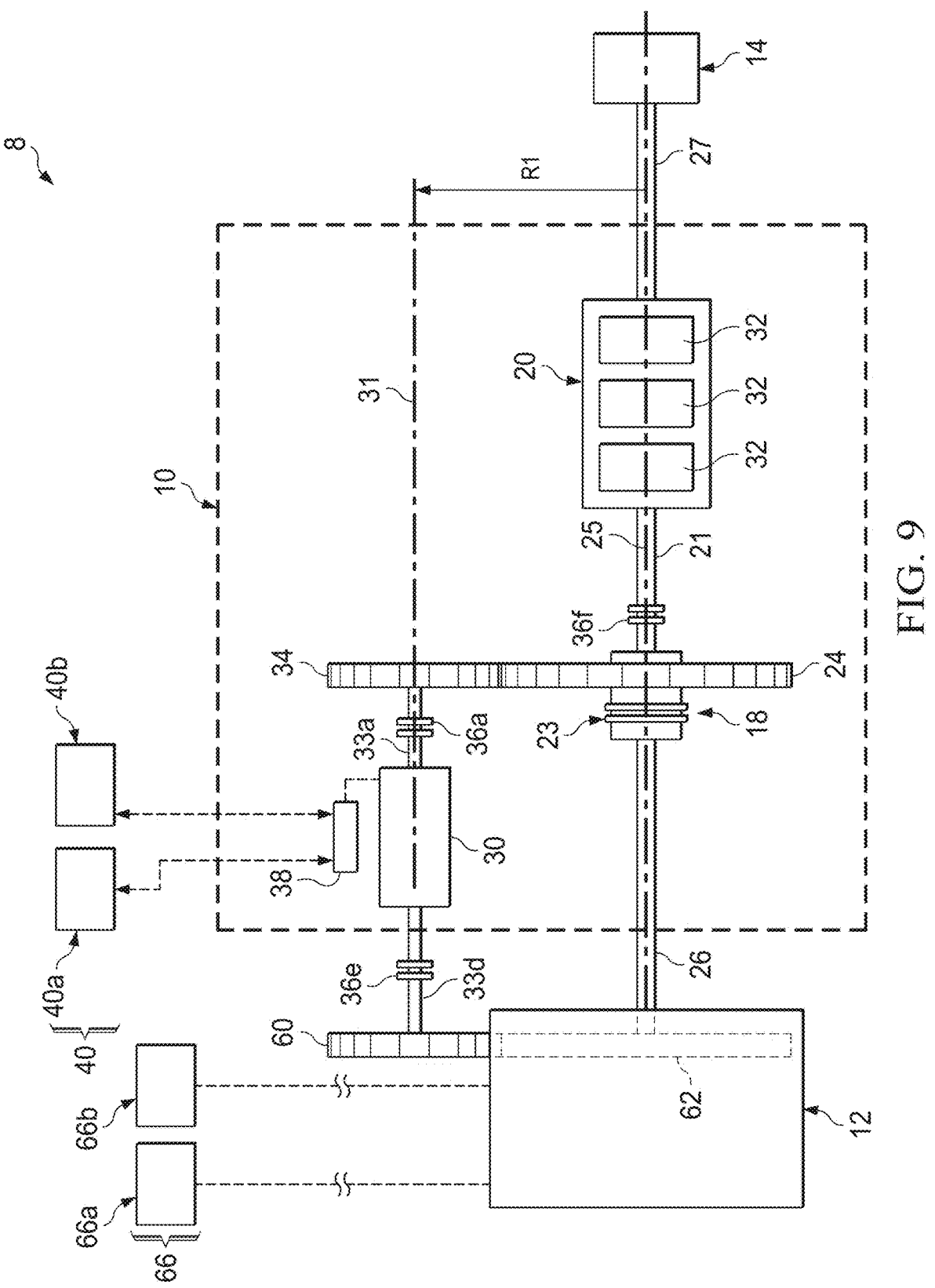
FIG. 9 illustrates a hybrid hydraulic fracturing system having a hybrid electric transmission assembly with electric motors disposed to assist an external power source during startup or provide power to primary drive train gear assembly during a gear change.

The hybrid electric transmission assembly 10 of FIG. 9 is similar to FIGS. 8*a* and 8*b* in that one or more electric motors 30 may be utilized initially to assist external power source 12 during startup, but in addition, the one or more electric motors 30 of hybrid electric transmission assembly 10 may also be utilized to provide power to one or both of driveshafts 26 and 21.

As shown in FIG. 9, external power source 12 includes a start gearset 62. Start gearset 62 may be internal to external power source 12, and disposed to cause initial rotation of driveshaft 26, either directly or by causing rotation of a crankshaft (not shown) within external power source 12. Start gearset 62 is meshed with an assist gearset 60 which is driven by electric motor 30. In one or more embodiments, assist gearset 60 may be mounted along a start driveshaft 33*d* which is driven by electric motor 30.

An engagement mechanism 36*e* mounted along start driveshaft 33*d* may be utilized to selectively couple and decouple electric motor 30 from assist gearset 60 and start gearset 62.

Engagement mechanism 36*a* may be selectively activated to couple and decouple electric motor 30 with drive gear 34, allowing electric motor to operate as described above with respect to FIG. 1 to provide equilibrium power to external load 14.

In one or more embodiments, an engagement mechanism 36*f* may be provided along transmission driveshaft 21 to decouple external power source 12 from primary drive train assembly 20, isolating external power source 12 from external load 14, thereby allowing electric motor 30 to provide a controlled load on external power source 12 during start up. As described above, such functionality might be desirable where electric motor 30 is utilized to apply a controlled startup torque on external power source 12 during startup of external power source 12 until external power source 12 achieves predetermined operating thresholds or parameters, after which, electric motor 30 may be disengaged from driveshafts 26 and 21.

FIG. 9 also illustrates external power source 12 having a fuel source 66. Where external power source 12 is an internal combustion engine, fuel source 66 may be any fuel combustible by internal combustion engine 12. In a non-limiting example, fuel source 66 may be diesel fuel or natural gas. In one or more embodiments, to address scarcity of a single type of fuel at any given time, or to take advantage of price differences between multiple fuel sources, external power source 12 may operate using more than one types of fuel. Thus, fuel source 66 may be two or more fuel sources such as the two external fuel sources 66*a*, 66*b* illustrated, providing flexibility in the overall input power source for hybrid electric transmission assembly 10. In one or more embodiments, fuel source 66*a* is a diesel or gasoline source and fuel source 66*b* is a gas source, such as natural gas.

Figure 10:
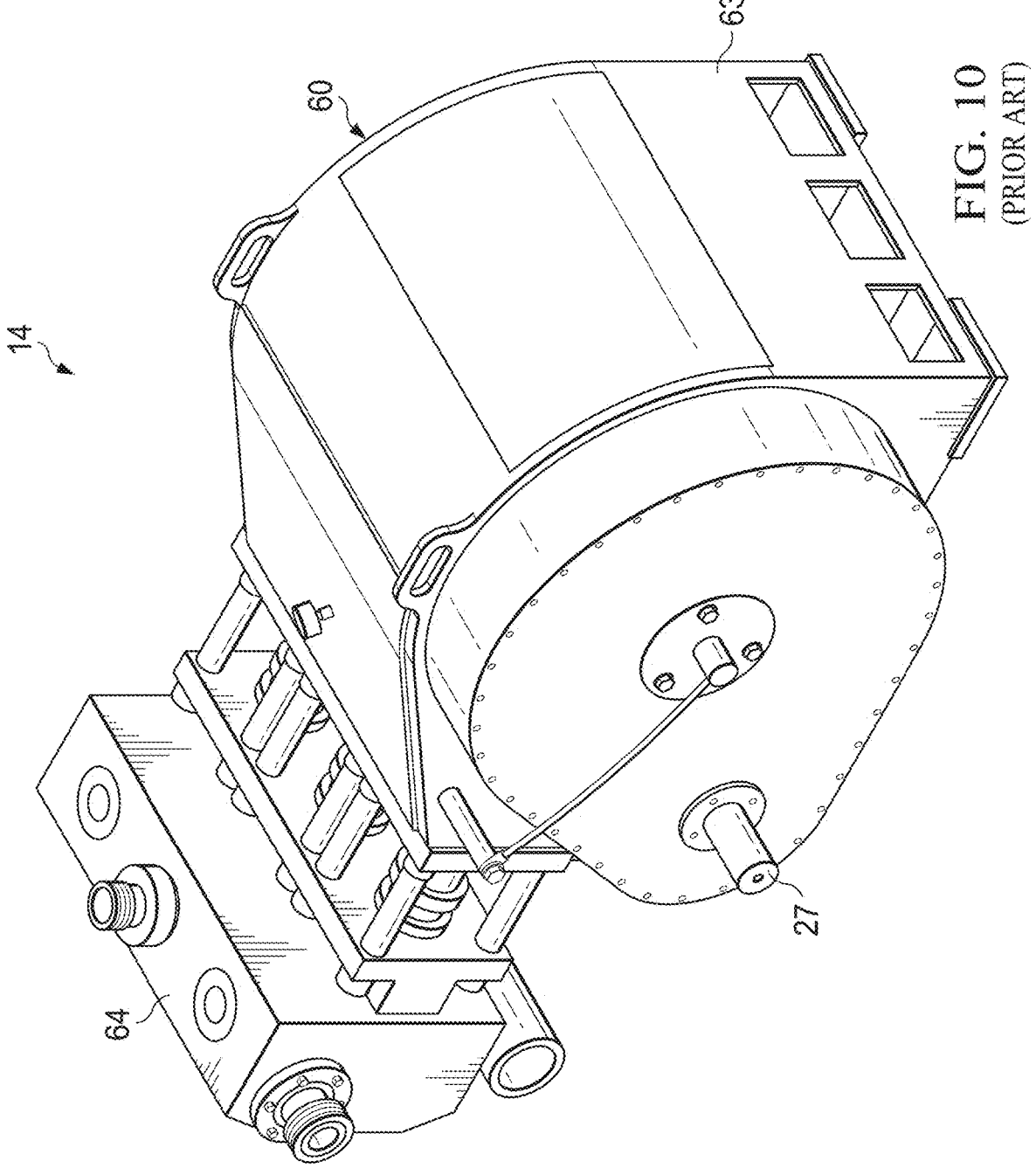
FIG. 10 illustrates a hydraulic fracturing pump.

FIG. 10 illustrates one possible external load 14 for use with hybrid electric transmission assembly 10, namely a hydraulic fracturing pump 60 having a power end 62 and a fluid end 64. Driveshaft 27 as described herein in any of the figures is utilized to provide power (either driving or equilibrium) to power end 62.

FIGS. 11*a*, 11*b* and 12*a*-12*c* illustrate embodiments of hybrid electric transmission assembly 10 as described above where a plurality of radially offset electric motors 30 and/or 30' are employed in hybrid electric transmission assembly 10.

Figure 11A:
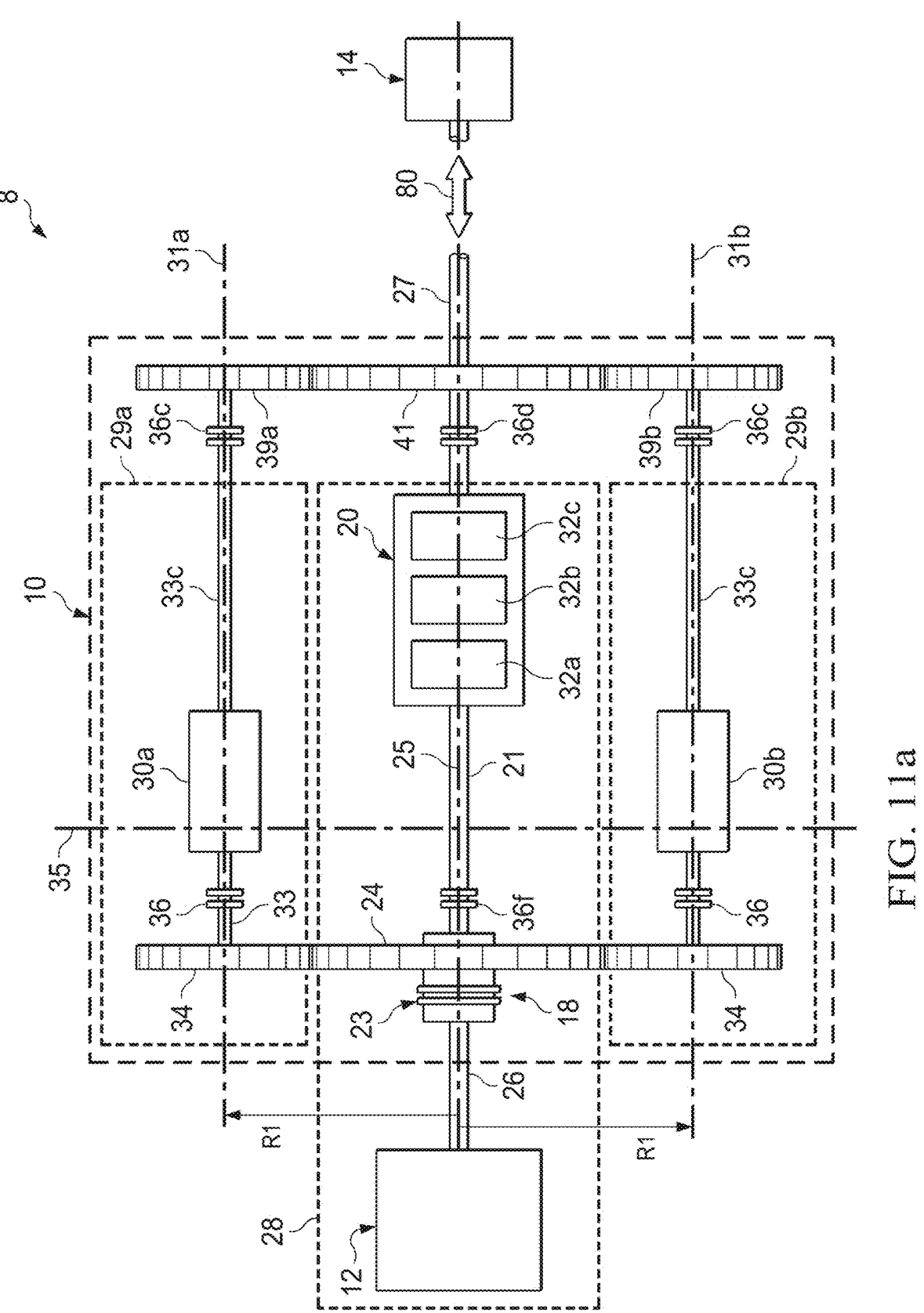
FIG. 11a illustrates a hybrid hydraulic fracturing system having a hybrid electric transmission assembly with multiple electric motors radially offset from the primary driveline.

In FIG. 11*a*, electric transmission assembly 10 is illustrated as having at least two radially offset electric motors 30*a*, 30*b*, each disposed along its own electric motor axis 31*a*, 31*b* that is parallel with the other electric motor axii 31 and each forming its own secondary drivetrain 29*a*, 29*b*, where secondary drivetrains 29*a*, 29*b* are parallel with but spaced radially apart from primary axis 25 and primary drivetrain 28. Each primary electric motor 30*a*, 30*b* includes an output gearset 34 that is meshed with electric drive gearset 24. In one or more embodiments, each primary electric motor 30*a*, 30*b* drives a respective primary electric output shaft 33 along which the gearset 34 for said primary electric motor 30 is disposed.

Each electric motor axis 31*a*, 31*b* is spaced radially outward from transmission primary axis 25 a distance R1, where R1 for each radially offset electric motor 30 may be the same or different.

In some embodiments, the plurality of radially offset electric motors 30 may be disposed in a plane 35 that is perpendicular to transmission primary axis 25, thereby standardizing their coupling to electric drive gearset 24.

An engagement mechanism 36 may be provided to selectively engage and disengage primary electric motor 30 from output gearset 34. In this regard, engagement mechanism 36 may be disposed along primary electric output shaft 33. In one or more embodiments, engagement mechanism 36 may be electrically activated, hydraulically activated, or magnetically or pneumatically activated.

External power source 12 is utilized to drive power input driveshaft 26, shown extending along transmission primary axis 25. Power input driveshaft 26 thereby transfers power through primary drive train gear assembly 20 and gearsets 32*a*, 32*b*, 32*c* to an output shaft 27 providing power to an external load 14.

Electric transmission assembly 10 of FIG. 11*a* may also include an engagement mechanism 18 disposed along input driveshaft 26 between output gearset 34 and external power source 12. In some embodiments, engagement mechanism 18 may be a torque converter assembly 23.

FIG. 11*a* also illustrates that optionally, or in the alternative to the above described arrangements having output gearsets 34 and electric drive gearset 24, the two or more radially offset electric motors 30*a*, 30*b* can be utilized to drive respective output gearset 39*a*, 39*b* meshed to a drive gearset 41 downstream of primary drive train gear assembly 20 and disposed to provide power directly to output driveshaft 27, bypassing primary drive train gear assembly 20. In this regard, the arrangement functions as described herein with respect to FIG. 3.

Figure 11B:
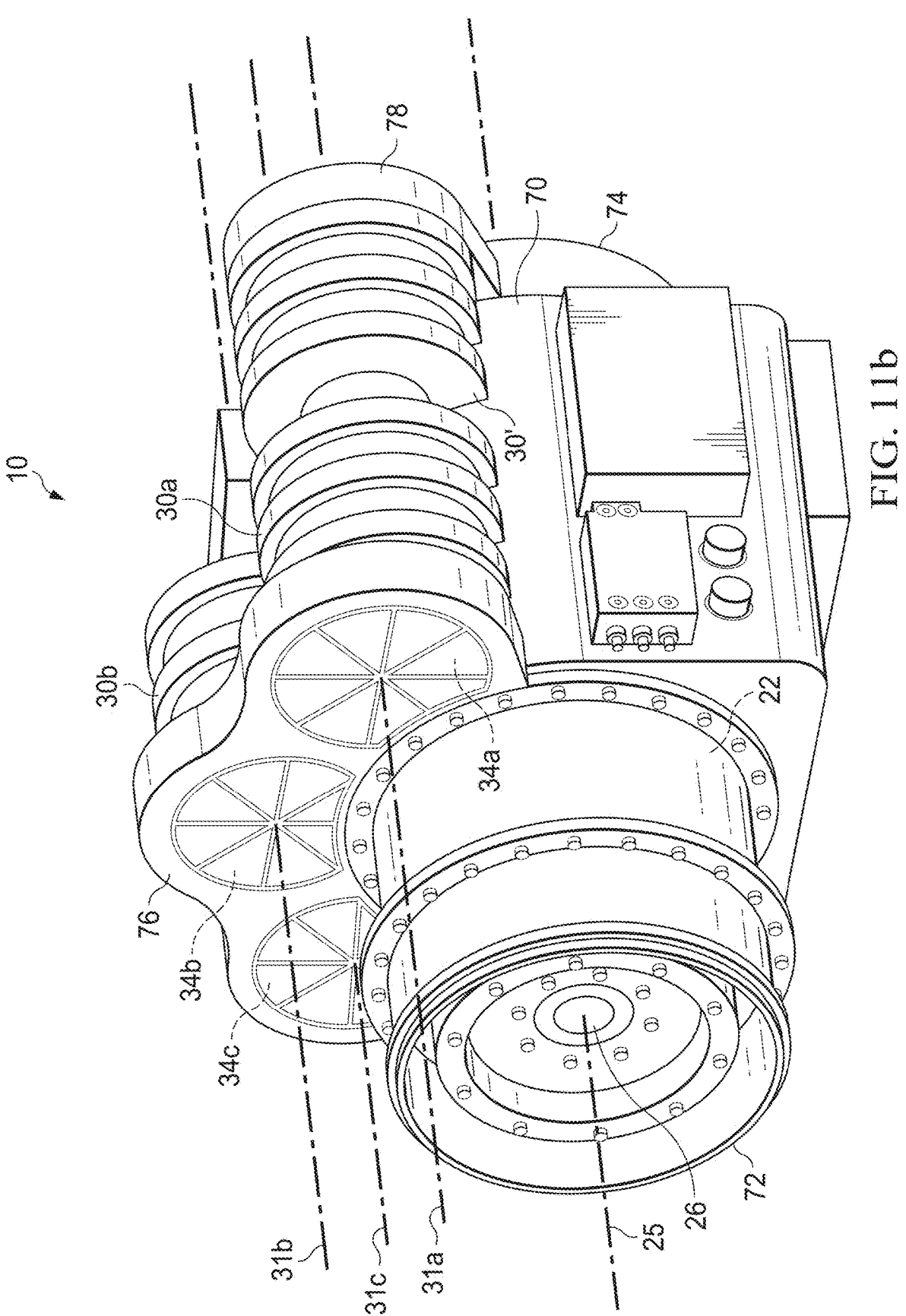
FIG. 11b is a perspective view of a hybrid hydraulic fracturing system having a hybrid electric transmission assembly with multiple electric motors radially offset from the primary driveline

With reference to FIG. 11*b*, in one or more embodiments, the one or more radially offset electric motors 30 described in any of the embodiments of any of the figures of the disclosure may be supported on a transmission housing 70, thereby minimizing the overall footprint of electric transmission assembly 10.

Specifically, electric transmission assembly 10 includes a transmission housing 70 having a first end 72 and a second end 74, where housing 70 extends along transmission primary axis 25. Power input driveshaft 26 is shown extending along transmission primary axis 25 at the first end 72 of housing 70.

Although transmission housing 70 may only support a single radially spaced electric motor 30, in some embodiments a plurality of radially spaced electric motors 30 may be supported on transmission housing 70, where each of the one or more electric motors 30 is disposed along its own electric motor axis 31 that is spaced radially outward from transmission primary axis 25.

In the illustrated embodiment of FIG. 11*b*, transmission housing 70 supports primary electric motors 30*a*, 30*b* and 30*c* (not shown in FIG. 11*a*), where each primary electric motor 30 is disposed along its own electric motor axis 31*a*, 31*b*, 31*c*, respectively, that is parallel with but spaced radially outward from primary axis 25 a distance R1.

In one or more embodiments, primary electric motors 30*a*, 30*b*, 30*c* may be mounted adjacent or closer to first end 72 of housing 70 since primary electric motors 30a, 30b, 30c are disposed to provide power to electric drive gearset 24 upstream of primary drive train gear assembly 20 (see FIG. 11a). In this regard, disposed along each electric motor axis 31a, 31b, 31c is an output gear 34a, 34b, 34c (see FIGS. 11a, 12a-12c) coupled to a respective primary electric motor 30a, 30b and 30c which output gears 34a, 34b, 34c are meshed directly or indirectly with electric drive gearset 24 (see FIG. 11a). As indicated by the dashed leader lines, output gears 34a, 34b, 34c are housed in gearbox housing 76 adjacent first end 72 of transmission housing 70.

As noted above, where the one or more electric motors 30 are mounted on transmission housing 70, the footprint of hybrid electric transmission assembly 10 can be reduced.

FIG. 11b also illustrates that one or more auxiliary electric motors 30' as described above for example in FIGS. 3, 4a, 4b, 5 and 6 among others, for powering an electric drive gearset 41 (see FIG. 11a) can be mounted on transmission housing 70, with or without primary electric motors 30a, 30b and 30c. Although not necessary, in some embodiments, such auxiliary electric motors 30' may be mounted on transmission housing 70 adjacent to or closer to the second end 74 of transmission housing 70, particularly as compared to primary electric motors 30a, 30b, 30c where present, since auxiliary electric motors 30' are disposed to provide power to output driveshaft 27 downstream of primary drivetrain gear assembly 20 (see FIG. 11a). In some embodiments, a gearbox housing 78 adjacent second end 74 of transmission housing 70 may house the electric drive gearsets 39 driven by auxiliary electric motors 30' and meshed with electric drive gearset 41 (see FIG. 11a).

As indicated by the dashed leader, a torque converter assembly 23 may be disposed in housing 70 so as to be between output gears 34 and the first end 72 of transmission housing 70.

FIGS. 12a, 12b and 12c illustrate different arrangements of electric motors 30 disposed about transmission primary axis 25. Such arrangements would also apply to auxiliary electric motors 30' described herein and utilized to bypass primary drivetrain gear assembly 20. In FIG. 12a, electric motors are positioned adjacent one another about transmission primary axis 25 such as is illustrated in FIG. 11b, while in each of FIGS. 12b and 12c, electric motors 30 are spaced symmetrically about transmission primary axis 25.

In FIG. 12b, electric motors 30a, 30b and 30c are spaced approximately 120 degrees apart from one another about transmission primary axis 25. In FIG. 12c, electric motors 30a, 30b, 30c and 30d are spaced approximately 90 degrees apart from one another about transmission primary axis 25, such that electric motors 30a and 30b oppose one another about transmission primary axis 25 and electric motors 30c and 30d oppose one another about transmission primary axis 25.

By utilizing a symmetrical arrangement of electric motors 30 about transmission primary axis 25 as illustrated in FIGS. 12b and 12c, the load balance on primary electric drive gearset 24 (or electric drive gearset 41 as the case may be) is more evenly distributed, extending the operating life of hybrid electric transmission assembly 10.

In some embodiments, hybrid electric transmission assembly 10 includes an even number of electric motors 30 (see FIG. 12c), such as the non-limiting example of two, four, six eight or ten, whereby pairs of electric motors oppose one another about axis 25, while in other embodiments, hybrid electric transmission assembly 10 includes an odd number of electric motors 30, which in some embodiments, may be symmetrically spaced as illustrated in FIG. 12b.

In some embodiments, the total kW power output of the plurality of electric motors 30 is greater than the kW power output of the external power source 12 to ensure the hand-off during gear changes is not impacted by torque from the external load 14.

With continuing reference to FIGS. 12a, 12b and 12c, one benefit to utilizing a plurality of electric motors 30, regardless of the arrangement, is that one electric motor, for example, electric motor 30a can be utilized diagnostically or preventatively to test the operation of a different electric motor, such as for example, electric motor 30b and or electric motor 30c. In other words, electric motor 30a may be utilized to provide input to electric motor 30b to determine if electric motor 30b (and/or electric motor 30c as the case may be) is operating as expected or within desired operating parameters.

As used throughout the disclosure, any reference to a "gearset" shall mean one or more gears through which rotational force is transferred, which one or more gears may include, but are not limited to spur gears and planetary gears.

As used herein, unless otherwise stated, any electric motor may also function as an electric generator.

Unless otherwise described, an output shaft 33 of an electric motor 30 may be internal or external to the electric motor 30. Likewise, output gearsets 34 and 39 may be internal or external to the electric motor 30.

Unless otherwise described, references to an electric motor 30 or 30' may include two or more or a plurality of electric motors 30, 30', each electric motor disposed along a separate electric motor axis 31 that is spaced radially outward from transmission primary axis 25.

Furthermore, where a hybrid electric transmission assembly 10 includes two or more electric motors 30 each extending along a separate radially spaced electric motor axis 31 but both meshed to the same drive gearset, such as illustrated in FIG. 1b, such two or more electric motors 30 may be operated in parallel or in the alternative depending on the power requirements of hybrid electric transmission assembly 10. For example, where each of such electric motors 30 individually have a smaller horsepower output than is required of an external load 14 but collectively have a horsepower output that is equal to or greater than the horsepower requirements of external load 14, the multiple electric motors 30 may be operated in parallel.

Furthermore, where a hybrid electric transmission assembly 10 includes two or more electric motors 30 extending along the same radially spaced electric motor axis 31, such as is illustrated in FIG. 2, such two or more electric motors 30 may be operated in series or in the alternative depending on the power requirements of hybrid electric transmission assembly 10. For example, where each of such electric motors 30 individually have a smaller horsepower output than is required of an external load 14 but collectively have a horsepower output that is equal to or greater than the horsepower requirements of external load 14, the multiple electric motors 30 may be operated in series.

Figure 13:
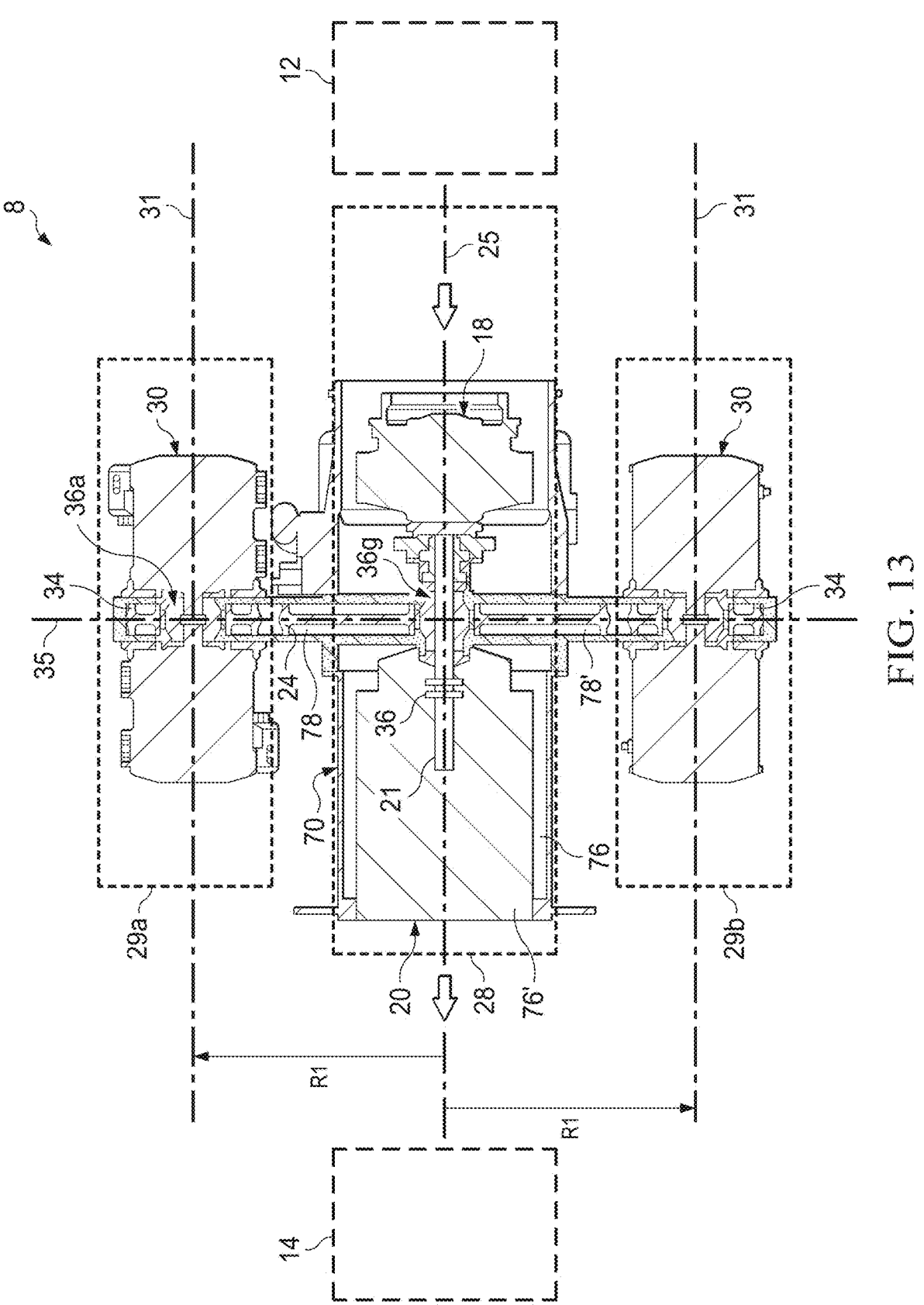
FIG. 13 illustrates a hybrid hydraulic fracturing system having a hybrid electric transmission assembly with multiple electric motors radially offset from the primary driveline with perpendicular gearbox assemblies.

With reference to FIG. 13, a partial cutaway of one embodiment of hybrid electric transmission assembly 10 is illustrated where multiple secondary drivetrains 29 are illustrated as spaced radially outward from primary drivetrain 28 as described above. In this embodiment, primary drivetrain gearbox assembly 76 and secondary drivetrain gearbox assembly 78 are emphasized, where transmission housing 70 extending along transmission primary axis 25 may support primary drivetrain gearbox assembly 76 and secondary drivetrain gearbox assembly 78 as described above.

More specifically, primary drivetrain gearbox assembly 76 houses the primary drive train gear assembly 20 and any engagement mechanism 18 (such as a torque converter assembly 23 described above with reference to FIG. 1a). Likewise, secondary drivetrain gearbox assembly 78 houses primary electric drive gearset 24 and output gearsets 34.

Multiple electric motors 30a, 30b are shown, each disposed along an electric motor axis 31 that is spaced radially apart from transmission primary axis 25 a distance R1. Electric motors 30a, 30b are coupled to output gearsets 34 which are in turn meshed with primary electric drive gearset 24 mounted on transmission driveshaft 21, with secondary drivetrain gearbox assembly 78 extending perpendicularly to transmission primary axis 25 in order to couple electric motors 30 to transmission driveshaft 21.

Moreover, it will be appreciated that primary drivetrain gearbox assembly 76 and secondary drivetrain gearbox assembly 78 each form fluid reservoirs for hybrid electric transmission assembly 10, specifically shown as primary gearbox reservoir 76' and secondary gearbox reservoir 78'. In one or more embodiments, fluid reservoirs 76', 78' are fluidically isolated from one another, while in other embodiments, fluid reservoirs 76', 78' may be in fluid communication with one another.

Optionally, one or more engagement mechanisms, such as engagement mechanism 36f disposed along driveline 21, may be provided to isolate primary electric drive gearset 24 from primary drive train assembly 20 during the operation described below. In addition, an engagement mechanism 18 may also be utilized to isolate primary electric drive gearset 24 from external power source 12 during the operation described below.

In one or more embodiments, electric motors 30 may be operated prior to engagement with transmission driveline 21 in order to heat up the fluid within secondary drivetrain gearbox assembly 78, and in particular, the gearbox fluid within secondary gearbox reservoir 78'. The heat generated from such operation in turn may be transmitted to the gearbox fluid within primary gearbox reservoir 76' to achieve a desired operating temperature for the gearbox fluid within primary gearbox reservoir 78' prior engagement of external power source 12 with external load 14. It will be appreciated that in one or more embodiments, primary gearbox reservoir 76' and secondary gearbox reservoir 78' are are in thermal communication but not in fluid communication such that the gearbox fluid in each do not comingle. However, in other embodiments, primary gearbox reservoir 76' and secondary gearbox reservoir 78' may be in fluid communication with one another so that heated fluid within secondary gearbox reservoir 78' can be transferred to primary gearbox reservoir 76' once the transmission fluid has been heated through operation of electric motors 30.

In the illustrated embodiment of FIG. 13, rather than utilizing a primary electric output driveshaft 33 and engagement mechanism 36 as illustrated in FIG. 11a, output gearsets 34 are meshed directly or indirectly with a primary electric gearset 24 which may be engaged and disengaged with transmission driveshaft 21 optionally via an engagement mechanism 36f or engagement mechanism 36g.

Unless otherwise described, all other components of transmission assembly 10 of FIG. 13 function as described with respect to the various embodiments of hybrid electric transmission assembly 10 of the other figures throughout the specification, including, optionally, energizing electric motors 30 with electric power source 40, whether a battery assembly 40a or an another electricity source 40b alone or in combination with one another.

Although the preceding method of warming or preheating transmission fluid is described and illustrated utilizing multiple electric motors 30, it will be appreciated that the method may be performed with just a single electric motor 30 in other embodiments.

Figure 14:
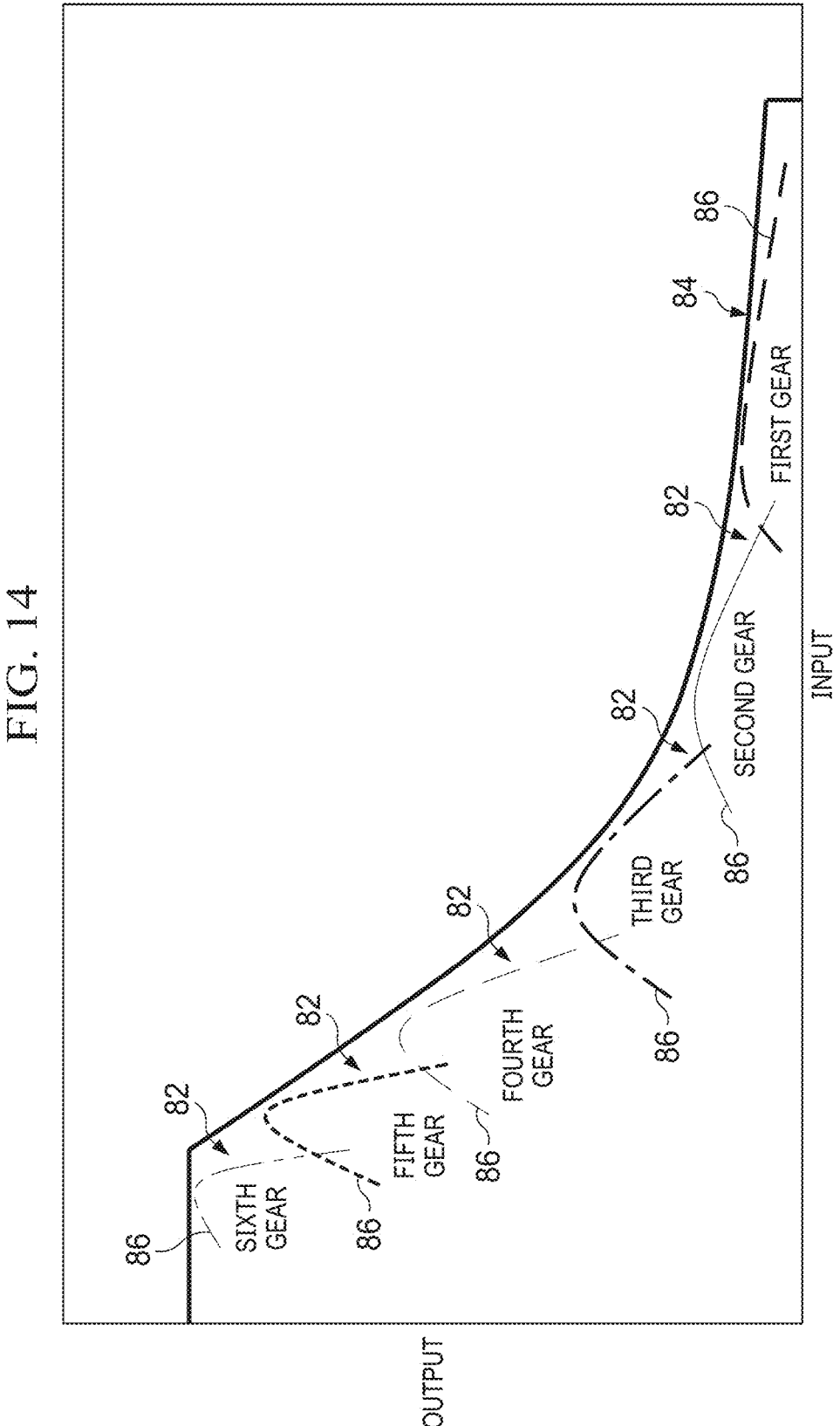
FIG. 14 is a hydraulic fracturing transmission power curve illustrating non-inertia pulldown during gear changes.

FIG. 14 illustrates the potential impact of hybrid electric transmission assembly 10 in operation of a hydraulic fracturing pump 14. Typically, during a gear change of a transmission, power output to the hydraulic fracturing pump 14 from an external power source, such internal combustion engine 12 is temporarily interrupted, causing a lag in power as depicted by areas 82 under power curve 84. Where the external load is an inertial external load, the external load will continue to have momentum during the power interruption where the momentum helps carry the external load during the gear change, thus overcoming the lag in power experienced by the external load during the gear change. In other words, the inertial external load causes a gradual bleed-off of power from the external power source 12 when the driving force is removed. In such case, areas 82 under the power curve 84 are minimized. Once the gear change is complete, the power from external power source 12 may then be readily increased without the need to overcome torque from a dead stop of the external load. In the instance of a non-inertial external load such as hydraulic fracturing pump 14 however, a dead head situation can occur where the external load causes an immediate termination of power from the external power source 12 upon removal of the driving force. In such case, areas 82 under the power curve 82 increase. By utilizing the plurality of electric motors 30 of hybrid electric transmission assembly 10, areas 82 under the power curve 82 can be minimized for non-inertial external loads 14, it being understood that the faster the gear ratio can be changed and implemented, the less likely a stall condition for external power source 12.

For example, in the case hydraulic fracturing pump 14 producing fluid flow (output) against an external pressure (load) on the pumped fluid (which external pressure may be caused by other interconnected reciprocating pumps or other external pressure sources), during a gear change for the reciprocating pump, there can be a gear change power lag. During the power lag, the effective pressure from the other interconnected pumps and/or external pressure source causes a back pressure on the reciprocating pump to which the gear change is applied, resulting in bog down of such reciprocating pump. Such pump bog down is shown in the graph as areas 82 under power curve 84, between the power curve 84 and the individual gear curves 86. These areas 82 represent inefficiency in the overall transmission system.

It will be appreciated that hybrid electric transmission assembly 10 maximizes energy transition efficiency by using the power from a plurality of electric motor(s) 30 to minimize power lag and the resulting pump bog down. In the graph, the vertical "Y" axis is pressure (load), and the horizontal "X" axis is flow (output). The reciprocating pump 14 produces flow, pumping a liquid or mixture over a given amount of time. The pressure in the reciprocating pump 14 and hybrid electric transmission assembly 10 is the resistance to flow. The result of Pressure x Flow is Horsepower (HP) and can also be quantified in kW. As the reciprocating pump 14 and hybrid electric transmission assembly 10 are used to increase flow, they start off in a low gear to maximize torque against a higher pressure. As electric transmission assembly 10 shifts through the gears, the output of reciprocating pump 14 increases in speed (rpm) resulting in a higher flow rate. In the hybrid electric transmission assembly 10, during a gear change, energy output from the one or more electric motors 30 is utilized to minimize non-inertial pull-down represented by the power lag areas 82. In other words, by handing off power to electric motors 30 during a gear change when power to external load 14 is temporarily suspended, and thereafter, handing back power to the external power source 12 when power to external load 14 is resumed, the power lag 82 during a gear change as described above is minimized.

Power curve 84 is illustrative of gear changes for all of the various transmission assemblies 10, 10', 10" discussed above, regardless of the electric power source 40 providing electric power for the duration of the gear change operation.

Figure 15:
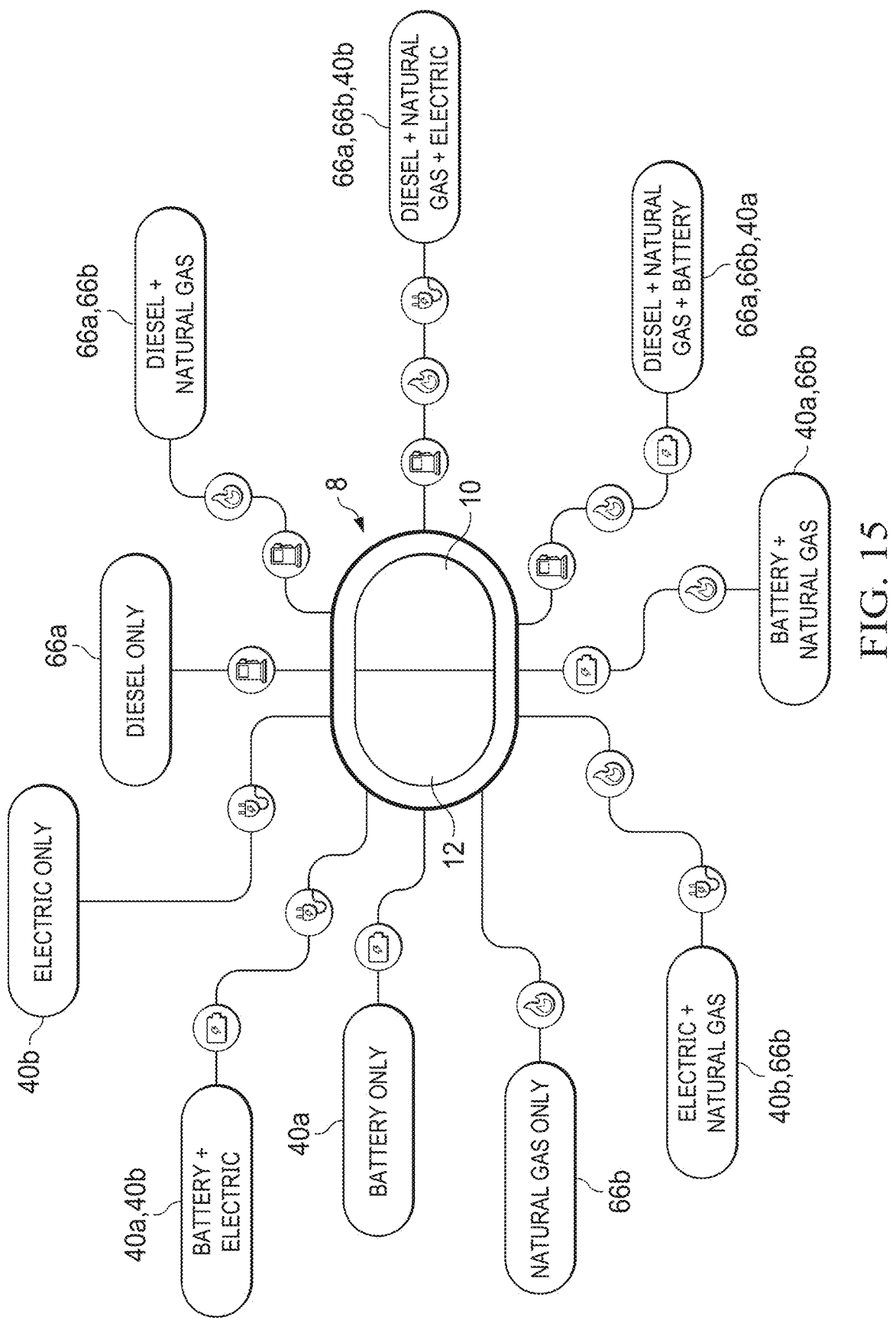
FIG. 15 illustrates the hybrid nature of the transmission system.

FIG. 15 illustrates the hybrid nature of the hydraulic fracturing system 8 disclosed herein. Specifically, hydraulic fracturing system 8 as described herein can utilize any number of external energy sources to produce power, such as electricity source(s) 40 and fuel source(s) 66 described above. With respect to transmission assembly 10, it will be appreciated that the transmission assembly can manage power production (regardless of the use of the power either to drive external load 14 or to provide equilibrium power during a gear change) based on the availability of any given external energy source, the cost of any given external energy source, as well as other factors related to the external energy source, such as emissions. Although not necessary for all embodiments of hydraulic fracturing system 8 as described herein, in the embodiment of hybrid hydraulic fracturing system 8 as illustrated in FIG. 15, an external power source 12 is provided that can operate using at least two types of fuel, such as liquid fuel 66a and gaseous fuel 66b. Likewise, at least two electricity sources are provided, such as local electricity storage 40a and an external electricity source 40b as described above. A hybrid hydraulic fracturing system 8 having at least three and preferably four of these external energy sources 40a, 40b, 66a, 66b provides maximum flexibility to ensure continuous operation of hybrid hydraulic fracturing system 8 at the lowest possible cost at any given time.

Thus, a hybrid hydraulic fracturing system has been described.

Optionally, the hybrid hydraulic fracturing system may include an internal combustion engine; a hydraulic fracturing pump; a transmission assembly having a first driveshaft, a second driveshaft, a primary drivetrain gear assembly coupling the first driveshaft to the second driveshaft, and a supplemental electric drive gearset disposed along the second driveshaft, the first driveshaft operatively coupled to the internal combustion engine and the second driveshaft operatively coupled to the hydraulic fracturing pump; and an electric motor couplable to the supplemental electric drive gearset.

Optionally, the hybrid hydraulic fracturing system may include an internal combustion engine having a power input driveshaft and a start gearset coupled to the power input driveshaft; a hydraulic fracturing pump; a transmission assembly having a first driveshaft, a second driveshaft, a primary drivetrain gear assembly coupling the first driveshaft to the second driveshaft, the first driveshaft operatively coupled to the power input driveshaft of the internal combustion engine and the second driveshaft operatively coupled to the hydraulic fracturing pump; and an electric motor couplable to the start gearset of the internal combustion engine.

Optionally, the hybrid hydraulic fracturing system may include an internal combustion engine; a hydraulic fracturing pump; a transmission assembly having a first driveshaft extending along a transmission primary axis, a second driveshaft extending along a transmission primary axis, a primary drivetrain gear assembly coupling the first driveshaft to the second driveshaft, and a transmission housing having a first end and a second end and enclosing the primary drivetrain gear assembly, with the first driveshaft extending from the first end of the housing and operatively coupled to the internal combustion engine, and the second driveshaft extending from the second end of the housing and operatively coupled to the hydraulic fracturing pump; and a plurality of electric motors each couplable to at least one of the first and second driveshafts, each electric motor disposed to drive a separate electric output shaft extending along separate electric motor axii, wherein the electric motor axii of the plurality of electric motors is parallel with but spaced radially outward from the transmission primary axis.

Optionally, the hybrid hydraulic fracturing system may include a transmission housing; a torque converter disposed in the transmission housing; a power input shaft coupled to the torque converter and extending from the transmission housing; a drive train assembly disposed in the transmission housing and coupled to the torque converter via a transmission driveshaft; an output driveshaft extending from the drive train assembly through the transmission housing; a primary electric drive gearset coupled to the transmission driveshaft between the torque converter and the drive train assembly; and at least one primary electric motor having a primary electric output shaft coupled to the electric drive gearset.

Optionally, the hybrid hydraulic fracturing system may include a transmission housing having a first end and a second end with a power input shaft extending from the first end and an output driveshaft extending from the second end; a torque converter disposed in the transmission housing and coupled to the power input shaft; a drive train assembly disposed in the transmission housing and coupled to the torque converter via a transmission driveshaft, wherein the output driveshaft is coupled to the drive train assembly; a primary electric drive gearset coupled to the transmission driveshaft between the torque converter and the drive train assembly; and at least two primary electric motors mounted on the transmission housing adjacent the first end, each primary electric motor having a separate primary electric output shaft coupled to the electric drive gearset.

Optionally, the hybrid hydraulic fracturing system may include an internal combustion engine; a hydraulic fracturing pump; a transmission housing having a first end and a second end with a power input shaft extending from the first end and an output driveshaft extending from the second end with the power input shaft coupled to the internal combustion engine and the output driveshaft coupled to the hydraulic fracturing pump; a drive train assembly disposed in the transmission housing and coupling the power input shaft to the output driveshaft; a primary electric drive gearset coupled to one of the input shaft or the output driveshaft; and at least two primary electric motors mounted on the transmission housing and each of the at least two primary electric motors coupled to the primary electric drive gearset.

Optionally, the hybrid hydraulic fracturing system may include an internal combustion engine; a hydraulic fracturing pump; a transmission housing having a first end and a second end with a power input shaft extending from the first end and an output driveshaft extending from the second end with the power input shaft coupled to the internal combustion engine and the output driveshaft coupled to the hydraulic fracturing pump; a drive train assembly disposed in the transmission housing and coupling the power input shaft to the output driveshaft; a primary electric drive gearset coupled to one of the input shaft or the output driveshaft; and a plurality of primary electric motors mounted on the transmission housing, each of the plurality of primary electric motors couplable to the primary electric drive gearset.

Optionally, the hybrid hydraulic fracturing system may include a transmission housing; an engagement mechanism disposed in the transmission housing; a power input shaft coupled to the engagement mechanism and extending from the transmission housing; a drive train assembly disposed in the transmission housing and coupled to the torque converter via a transmission driveshaft; an output driveshaft extending from the drive train assembly through the transmission housing; a primary electric drive gearset coupled to the transmission driveshaft between the torque converter and the drive train assembly; and at least one primary electric motor having a primary electric output shaft coupled to the electric drive gearset.

Optionally, the hybrid hydraulic fracturing system may include an internal combustion engine; a hydraulic fracturing pump; and a transmission assembly having a first driveshaft coupled to the internal combustion engine and a second driveshaft coupled to the hydraulic fracturing pump, the first and second driveshafts extending along a transmission primary axis; a primary drivetrain gear assembly coupling the first driveshaft to the second driveshaft to define a primary drivetrain; an electric drive gearset mounted on one of the first or second driveshafts; two or more secondary drivetrains, each secondary drivetrain having an electric motor with a electric motor axis and an output gearset disposed along the electric motor axis and coupled to the electric motor, wherein each separate electric motor axis is parallel with but spaced radially apart from the transmission primary axis so that the secondary drivetrains are radially offset from the transmission primary axis, wherein the output gearset of each secondary drivetrain is meshed with the electric drive gearset.

Optionally, the hybrid hydraulic fracturing system may include an internal combustion engine; a hydraulic fracturing pump; and a transmission assembly having a first driveshaft coupled to the internal combustion engine and a second driveshaft coupled to the hydraulic fracturing pump, the first and second driveshafts extending along a transmission primary axis; a primary drivetrain gear assembly coupling the first driveshaft to the second driveshaft to define a primary drivetrain; an electric drive gearset mounted on one of the first or second driveshafts; a secondary drivetrain, the secondary drivetrain having an electric motor with an electric motor axis and an output gearset disposed along the electric motor axis and coupled to the electric motor, wherein the electric motor axis is parallel with but spaced radially apart from the transmission primary axis so that the secondary drivetrain is radially offset from the transmission primary axis, wherein the output gearset of the secondary drivetrain is meshed with the electric drive gearset.

Optionally, the hybrid hydraulic fracturing system may include an internal combustion engine; a hydraulic fracturing pump; a transmission assembly having a first driveshaft coupled to the internal combustion engine and a second driveshaft coupled to the hydraulic fracturing pump, the first and second driveshafts extending along a transmission primary axis; a primary drivetrain gear assembly coupling the first driveshaft to the second driveshaft; a first electric drive gearset mounted on the first driveshaft between the primary drivetrain gear assembly and the internal combustion engine; a second electric drive gearset mounted on the second driveshaft between the primary drivetrain gear assembly and the hydraulic fracturing pump; and an electric motor having an electric motor axis, a first output gearset and a second output gearset mounted along the electric motor axis and couplable to the electric motor, the electric motor axis parallel with but spaced radially apart from the transmission primary axis so that the electric motor is radially offset from the transmission primary axis, the first output gearset meshed with the first electric drive gearset and the second output gearset meshed with the second drive gearset.

Optionally, the hybrid hydraulic fracturing system may include an internal combustion engine; a hydraulic fracturing pump; a transmission assembly having a first driveshaft coupled to the internal combustion engine and a second driveshaft coupled to the hydraulic fracturing pump, the first and second driveshafts extending along a transmission primary axis; a primary drivetrain gear assembly coupling the first driveshaft to the second driveshaft to define a primary drivetrain; a first electric drive gearset mounted on the first driveshaft between the primary drivetrain gear assembly and the internal combustion engine; a second electric drive gearset mounted on the second driveshaft between the primary drivetrain gear assembly and the hydraulic fracturing pump; two or more secondary drivetrains, each secondary drivetrain having an electric motor with a electric motor axis, a first output gearset and a second output gearset mounted along the electric motor axis and couplable to the electric motor, the electric motor axis parallel with but spaced radially apart from the transmission primary axis so that the electric motor is radially offset from the transmission primary axis, the first output gearset meshed with the first electric drive gearset and the second output gearset meshed with the second drive gearset.

Optionally, the hybrid hydraulic fracturing system may include an internal combustion engine; a hydraulic fracturing pump; a transmission assembly having a first driveshaft coupled to the internal combustion engine and a second driveshaft coupled to the hydraulic fracturing pump, the first and second driveshafts extending along a transmission primary axis; a primary drivetrain gear assembly coupling the first driveshaft to the second driveshaft to define a primary drivetrain; and a torque converter assembly mounted on one of the driveshafts along the transmission primary axis, the torque converter assembly comprising a stator assembly and an impeller assembly, one or both of which are at least partially enclosed to defining a primary fluid reservoir; a pump in fluid communication with the primary fluid reservoir and at least one fluid supply reservoir to alter a fluid within the primary fluid reservoir.

Optionally, the hybrid hydraulic fracturing system may include an internal combustion engine having a start gearset; a hydraulic fracturing pump; a transmission assembly having a first driveshaft coupled to the start gearset of the internal combustion engine and a second driveshaft coupled to the hydraulic fracturing pump, the first and second driveshafts extending along a transmission primary axis; a primary drivetrain gear assembly coupling the first driveshaft to the second driveshaft to define a primary drivetrain to define a primary drivetrain; an electric drive gearset mounted on one of the first and second driveshafts; and a secondary drivetrain, the secondary drivetrain comprising an electric motor having an electric motor axis, an assist gearset mounted along the electric motor axis and an output gearset mounted along the electric motor axis, wherein the electric motor axis is parallel with but spaced radially apart from the transmission primary axis so that the electric motor is radially offset from the transmission primary axis, wherein the assist gearset is meshed with the start gearset of the internal combustion engine and wherein the output gearset is meshed with the electric drive gearset.

Optionally, the hybrid hydraulic fracturing system may include an internal combustion engine; a hydraulic fracturing pump; a transmission assembly having a first driveshaft coupled to the internal combustion engine and a second driveshaft coupled to the hydraulic fracturing pump, the first and second driveshafts extending along a transmission primary axis; a primary drivetrain gear assembly disposed within a primary gearbox reservoir, the primary drivetrain gear assembly coupling the first driveshaft to the second driveshaft to define a primary drivetrain; an electric drive gearset mounted on one of the first driveshaft or second driveshaft; two or more secondary drivetrains, each secondary drivetrain having an electric motor with an electric motor axis and an output gearset mounted along the electric motor axis and couplable to the electric motor, each electric motor axis parallel with but spaced radially apart from the transmission primary axis so that each electric motor is radially offset from the transmission primary axis, the output gearset of each secondary drivetrain meshed with the electric drive gearset; and a secondary drivetrain gearbox assembly comprising secondary gearbox reservoir, the secondary drivetrain gearbox assembly extending between the two or more secondary drivetrains along a plane that is perpendicular to transmission primary axis, the secondary drivetrain gearbox assembly with the output gearsets of the two or more secondary drivetrains disposed in the secondary gearbox reservoir.

Any of the foregoing embodiments of a hydraulic fracturing system may include alone or in combination, any of the following:

The primary gearbox reservoir and the secondary gearbox reservoir are fluidically isolated from one another.

The primary gearbox reservoir and the secondary gearbox reservoir are in fluid communication with one another.

At least three secondary drivetrains positioned about the transmission primary axis and spaced radially outward thereof.

At least three secondary drivetrains symmetrically spaced about the transmission primary axis and radially outward thereof.

The electric drive gearset is mounted on the first driveshaft.

The electric drive gearset is mounted on the second driveshaft between the primary drivetrain gear assembly and the hydraulic fracturing pump.

The electric drive gearset is mounted on the first driveshaft between the primary drivetrain gear assembly and the internal combustion engine.

The electric drive gearset is mounted on the second driveshaft between the primary drivetrain gear assembly and the hydraulic fracturing pump, the hybrid hydraulic fracturing system further comprising an engagement mechanism disposed along the second driveshaft between the electric drive gearset and the primary drivetrain gear assembly to selectively decouple the second driveshaft from the primary drivetrain gear assembly.

The electric drive gearset is mounted on the first driveshaft between the primary drivetrain gear assembly and the internal combustion engine, the hybrid hydraulic fracturing system further comprising an engagement mechanism disposed along the first driveshaft between the electric drive gearset and the internal combustion engine to selectively decouple the internal combustion engine from the first driveshaft during a gear change of the primary drivetrain gear assembly.

The electric drive gearset is mounted on the first driveshaft between the primary drivetrain gear assembly and the internal combustion engine, the hybrid hydraulic fracturing system further comprising an intermediate driveshaft extending along the transmission primary axis between the electric drive gearset and the primary drivetrain gear assembly; and an engagement mechanism disposed along the intermediate driveshaft.

A torque converter assembly mounted on one of the driveshafts along the transmission primary axis, the torque converter assembly comprising a stator assembly and an impeller assembly, one or both of which are at least partially enclosed to defining a primary fluid reservoir; a pump in fluid communication with the primary fluid reservoir and at least one fluid supply reservoir to alter a fluid within the primary fluid reservoir.

The torque converter assembly comprises at least two fluid supply reservoirs in fluid communication with the pump, the first fluid supply reservoir having a first fluid with a first fluid characteristic and the second fluid supply reservoir having a second fluid with a second fluid characteristic that is different than the first fluid characteristic.

The hybrid hydraulic fracturing system further comprising an engagement mechanism disposed along the second driveshaft between the second electric drive gearset and the primary drivetrain gear assembly to selectively decouple the second driveshaft from the primary drivetrain gear assembly.

An electrical inverter electrically coupled to a plurality of electric motors, each electric motor radially spaced outward from the primary drivetrain axis.

An electrical inverter electrically coupled to at least one of said electric motors; a first local source of electricity and a second source of electricity, wherein the first local source of electricity is a battery and the second source of electricity is a power grid or an electric generator.

An electrical inverter electrically coupled to at least one of said electric motors and a shift mechanism of the drive train gear assembly.

A first engagement mechanism, a second engagement mechanism and a third engagement mechanism, wherein the first engagement mechanism is disposed between the electric motor and the first driveshaft; wherein the second engagement mechanism is disposed between the electric motor and the second driveshaft; and wherein the third engagement mechanism is along the second driveshaft between the second electric gearset and the primary drivetrain assembly.

The electric motor coupled to the electric gearset is a stepper motor.

The primary drivetrain gear assembly comprises at least a first gearset, a second gearset and a third gearset.

The transmission assembly further comprises a torque converter disposed along the first driveline.

An electric output shaft coupled to the electric motor and extending along an electric motor axis, and an output gearset mounted on the electric output shaft, wherein the output gearset is meshed with the supplemental electric drive gearset disposed along the second driveshaft.

The first driveshaft and the second driveshaft extend along a transmission primary axis and the electric motor axis is parallel with but spaced radially outward from the transmission primary axis.

An engagement mechanism disposed along the second driveshaft between the primary drivetrain gear assembly and the supplemental electric drive gearset to selectively isolate the primary drivetrain gear assembly from the hydraulic fracturing pump.

The electric motor is an electric generator, and wherein the engagement mechanism disposed along the second driveshaft is engaged.

The electric motor is a stepper motor.

A plurality of electric motors each electric motor coupled to a separate electric output shaft extending along separate electric motor axii, wherein the first driveshaft and the second driveshaft extend along a transmission primary axis and the electric motor axii of the plurality of electric motors is parallel with but spaced radially outward from the transmission primary axis, and wherein each electric motor is coupled to the second driveshaft.

A transmission housing having a first end and a second end and enclosing the primary drivetrain gear assembly, with the first driveshaft extending from the first end of the housing and the second driveshaft extending from the second end of the housing, wherein the plurality of electric motors are supported on the transmission housing adjacent the second end of the transmission housing.

A start driveshaft extending along an electric motor axis and having an assist gearset mounted thereon, the assist gearset meshed with the start gearset of the internal combustion engine and the electric motor disposed to drive the star driveshaft.

The power input driveshaft extends along a transmission primary axis and the electric motor axis is parallel with but spaced radially outward from the transmission primary axis.

A plurality of electric motors coupled to the start gearset of the internal combustion engine, each electric motor disposed to drive a separate electric output shaft extending along separate electric motor axii, wherein the electric motor axii of the plurality of electric motors is parallel with but spaced radially outward from the transmission primary axis.

A transmission housing having a first end and a second end and enclosing the primary drivetrain gear assembly, with the first driveshaft extending from the first end of the housing and the second driveshaft extending from the second end of the housing, wherein the plurality of electric motors are supported on the transmission housing adjacent the first end of the transmission housing.

Each of the plurality of electric motors are supported on the transmission housing adjacent the first end of the transmission housing.

Each of the plurality of electric motors are supported on the transmission housing adjacent the second end of the transmission housing.

The transmission assembly further comprises a supplemental electric drive gearset disposed along the second driveshaft with at least a portion of the plurality of electric motors couplable to the supplemental electric drive gearset.

An output gearset driven by the electric output shaft and meshed with the electric drive gearset.

A clutch disposed along the electric output shaft.

A secondary electric motor having an intermediate driveshaft coupled to the at least one primary electric motor.

A clutch disposed along the intermediate driveshaft between the primary and secondary electric motors.

A plurality of primary electric motors.

A plurality of secondary electric motors.

A secondary electric motor having an intermediate driveshaft and a secondary electric output shaft, where the intermediate driveshaft is coupled to the at least one primary electric motor.

A secondary electric motor having a secondary electric output shaft, where the secondary output shaft is coupled to a supplemental electric drive gearset.

A clutch disposed along the secondary electric output shaft.

A secondary electric motor having an intermediate driveshaft having a clutch disposed therealong and a secondary electric output shaft having a clutch disposed therealong, where the intermediate driveshaft is coupled to the at least one primary electric motor and the secondary output shaft is coupled to a supplemental electric drive gearset.

A supplemental electric drive gearset disposed along the output driveshaft.

The drive train assembly comprises at least one planetary gearset.

The drive train assembly comprises at least nine planetary gearsets.

The drive train assembly comprises a plurality of planetary gearset.

The internal combustion engine, power input shaft and output driveshaft are aligned along a transmission primary axis.

Likewise, a method for operating a hydraulic fracturing pump has been described.

Optionally, the method may include utilizing a first gearset as the primary driving gear of a primary drivetrain gear assembly to pass driving power from an internal combustion engine to a hydraulic fracturing pump; initiating a gear change by i) isolating the primary drivetrain gear assembly from the hydraulic fracturing pump by decoupling the primary drivetrain gear assembly from the powering the hydraulic fracturing pump, and ii) driving the hydraulic fracturing pump with an electric motor during the gear change; engaging as the primary driving gear a second gearset of the primary drivetrain gear assembly while the primary drivetrain gear assembly is still isolated and the hydraulic fracturing pump is being driven by the electric motor; and coupling the second gearset to the hydraulic fracturing pump and driving the hydraulic fracturing pump utilizing the second gearset of the transmission to pass driving power from the internal combustion engine to the hydraulic fracturing pump.

Optionally, the method may include driving a hydraulic fracturing pump utilizing a first gearset as the primary driving gear of a primary drivetrain gear assembly to pass driving power from an internal combustion engine to the hydraulic fracturing pump; initiating a gear change by i) utilizing an electric motor to provide equilibrium power to a hydraulic fracturing pump; and ii) suspending driving power from the internal combustion engine to the hydraulic fracturing pump; engaging as the primary driving gear a second gearset of the primary drivetrain gear assembly while equilibrium power is passed to the hydraulic fracturing pump; and thereafter, driving the hydraulic fracturing pump utilizing the second gearset of the transmission to pass driving power from the internal combustion engine to the hydraulic fracturing pump.

Optionally, the method may include driving a hydraulic fracturing pump utilizing a first gearset as the primary driving gear of a primary drivetrain gear assembly to pass driving power from an internal combustion engine to the hydraulic fracturing pump; initiating a gear change by i) utilizing an electric motor to provide equilibrium power to a hydraulic fracturing pump; and ii) suspending driving power from the internal combustion engine to the hydraulic fracturing pump; engaging as the primary driving gear a second gearset of the primary drivetrain gear assembly while equilibrium power is passed to the hydraulic fracturing pump; removing equilibrium power transmission from the electric motor to the hydraulic fracturing pump; and thereafter, driving the hydraulic fracturing pump utilizing the second gearset of the transmission to pass driving power from the internal combustion engine to the hydraulic fracturing pump.

Optionally, the method may include operating an internal combustion engine to provide power to a transmission for a hydraulic fracturing pump; operating an electric motor to provide power to the transmission; utilizing the transmission to supplement the power from the internal combustion engine with power from the electric motor to produce output power; and utilizing the output power to operate a hydraulic fracturing pump.

Any of the foregoing methods for operating a hydraulic fracturing pump may include alone or in combination, any of the following:

Decoupling the electric motor from driving the hydraulic fracturing pump once the second gearset is coupled to the hydraulic fracturing pump.

Driving the electric motor to produce electricity utilizing the second gearset of the transmission while simultaneously driving the hydraulic fracturing pump.

The gear change from the first gearset to the second gearset as the primary driving gear is an upshift in gears.

The hydraulic fracturing pump has a horsepower rating that is greater than the horsepower rating of the internal combustion engine.

Utilizing the transmission to change gears at least once during operation of the hydraulic fracturing pump, wherein the electric motor is operated during the gear change to minimize pump bog down.

Utilizing the transmission to change gears at least six times during operation of the hydraulic fracturing pump, wherein the electric motor is operated during each gear change to minimize pump bog down during the gear change.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

What is claimed is:

1. A hybrid hydraulic fracturing system comprising:
an internal combustion engine;
a hydraulic fracturing pump;
a transmission assembly having a first driveshaft, a second driveshaft with at least one of the first or second driveshafts extending along a transmission primary axis, a primary drivetrain gear assembly having at least three gear ratios, the primary drivetrain gear assembly coupling the first driveshaft to the second driveshaft; an electric drive gearset separate from the primary drivetrain gear assembly and mounted on one of the first driveshaft or the second driveshaft apart from the primary drivetrain gear assembly; and a transmission housing having a first end and a second end and enclosing the primary drivetrain gear assembly, with the first driveshaft extending from the first end of the housing and operatively coupled to the internal combustion engine, and the second driveshaft extending from the second end of the housing and operatively coupled to the hydraulic fracturing pump; and
a plurality of electric motors disposed externally of the transmission housing, each of the plurality of electric motors having an output gearset disposed along an electric motor axis with each output gearset couplable to the electric drive gearset, wherein the electric motor axis of each of the plurality of electric motors is parallel with but spaced radially outward from the transmission primary axis and the transmission housing, and wherein each output gearset is separate from the primary drivetrain gear assembly.

2. The hybrid hydraulic fracturing system of claim 1, wherein each of the plurality of electric motors are supported on the transmission housing adjacent the first end of the transmission housing.

3. The hybrid hydraulic fracturing system of claim 1, wherein each of the plurality of electric motors are supported on the transmission housing adjacent the second end of the transmission housing.

4. The hybrid hydraulic fracturing system of claim 3, wherein the transmission assembly further comprises a supplemental electric drive gearset disposed along the second driveshaft between the primary drivetrain gear assembly and the hydraulic fracturing pump with at least a portion of the plurality of electric motors couplable to the supplemental electric drive gearset.

5. A hybrid hydraulic fracturing system comprising:
an internal combustion engine;
a hydraulic fracturing pump;
a transmission housing having a first end and a second end with an input driveshaft extending from the first end of the transmission housing and an output driveshaft extending from the second end of the transmission housing with at least one of the driveshafts extending along a transmission primary axis, the input driveshaft coupled to the internal combustion engine and the output driveshaft coupled to the hydraulic fracturing pump; a primary drivetrain gear assembly disposed in the transmission housing and having at least three gear ratios, the primary drivetrain gear assembly coupling the input driveshaft to the output driveshaft; an electric drive gearset separate from the primary drivetrain assembly and coupled to one of the input driveshaft or the output driveshaft so as to be spaced apart from the primary drivetrain assembly; and
at least two primary electric motors mounted on the transmission housing, wherein each of the at least two primary electric motors are coupled to the electric drive gearset.

6. The hybrid hydraulic fracturing system of claim 5, wherein the at least two primary electric motors mounted on the transmission housing comprises three primary electric motors mounted on the transmission housing and each of the three primary electric motors coupled to the primary electric drive gearset.

7. The hybrid hydraulic fracturing system of claim 5, wherein the input driveshaft extends along the transmission primary axis and each electric motor mounted on the transmission housing has an electric motor axis that is parallel with but spaced radially outward from the transmission primary axis.

* * * * *